United States Patent
Wada

(10) Patent No.: US 10,073,644 B2
(45) Date of Patent: Sep. 11, 2018

(54) ELECTRONIC APPARATUS INCLUDING MEMORY MODULES THAT CAN OPERATE IN EITHER MEMORY MODE OR STORAGE MODE

(71) Applicant: Toshiba Memory Corporation, Tokyo (JP)

(72) Inventor: Shintaro Wada, Bunkyo Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 13 days.

(21) Appl. No.: 15/446,969

(22) Filed: Mar. 1, 2017

(65) Prior Publication Data
US 2017/0269863 A1   Sep. 21, 2017

Related U.S. Application Data

(60) Provisional application No. 62/311,217, filed on Mar. 21, 2016.

(51) Int. Cl.
*G06F 12/00* (2006.01)
*G06F 3/06* (2006.01)

(52) U.S. Cl.
CPC .......... *G06F 3/0634* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,093,150 B2 | 7/2015 | Karamcheti et al. | |
| 9,104,315 B2* | 8/2015 | Sinclair | G06F 3/0607 |
| 9,158,716 B2 | 10/2015 | Hinkle et al. | |
| 9,280,497 B2 | 3/2016 | Berke et al. | |
| 9,318,156 B2 | 4/2016 | Kanapathippillai et al. | |
| 9,336,835 B2 | 5/2016 | Kanapathippillai et al. | |
| 2008/0195798 A1 | 8/2008 | Lee et al. | |
| 2009/0313416 A1 | 12/2009 | Nation | |
| 2011/0029723 A1 | 2/2011 | Lee et al. | |
| 2014/0075106 A1 | 3/2014 | Okin et al. | |
| 2014/0095769 A1 | 4/2014 | Borkenhagen | |
| 2014/0101370 A1 | 4/2014 | Chu et al. | |
| 2014/0244900 A1 | 8/2014 | Tzeng et al. | |
| 2014/0379969 A1 | 12/2014 | Karamcheti et al. | |
| 2015/0378642 A1* | 12/2015 | Moon | G06F 3/0619 711/103 |
| 2016/0041904 A1* | 2/2016 | Bhattacharya | G06F 17/30218 711/103 |

* cited by examiner

*Primary Examiner* — John A Lane
(74) *Attorney, Agent, or Firm* — Patterson & Sheridan, LLP

(57) ABSTRACT

An electronic apparatus includes a processor, non-volatile memory devices having first modules running in memory mode and second modules running in storage mode, and a memory controller. In response to a request to load data stored in a third module running in storage mode, into a space that is mapped by the memory controller, the processor changes the mode of the third module to memory mode and the memory controller creates a mapping for the data stored in the third module. In response to a request to copy data loaded into a space that is mapped by the memory controller to a module running in storage mode, the processor changes the mode of a third module, which is storing a portion of the data and running in memory mode, to storage mode.

20 Claims, 18 Drawing Sheets

ELECTRONIC APPARATUS INCLUDING MEMORY MODULES THAT CAN OPERATE IN EITHER MEMORY MODE OR STORAGE MODE

CROSS-REFERENCE TO RELATED APPLICATIONS

This application is based upon and claims the benefit of priority from U.S. Provisional Patent Application No. 62/311,217, filed on Mar. 21, 2016, the entire contents of which are incorporated herein by reference.

FIELD

Embodiments described herein relate generally to electronic memory devices.

BACKGROUND

Recently, overall access speed of non-volatile memories are becoming faster.

DETAILED DESCRIPTION

An electronic apparatus according to an embodiment includes a processor, non-volatile memory devices having first modules running in memory mode and second modules running in storage mode, wherein executable code of active programs being executed in the processor are stored in the first modules and executable code of non-active programs are stored in the second modules, and a memory controller configured to map logical addresses of the active programs to physical locations of the first modules. In response to a request to load data stored in a third module, which is running in the storage mode, into a space that is mapped by the memory controller, the processor changes the mode of the third module from storage mode to memory mode and the memory controller creates a mapping for the data stored in the third module. In response to a request to copy data loaded into a space that is mapped by the memory controller to a module running in the storage mode, the processor changes the mode of a third module, which is storing a portion of the data and running in memory mode, to storage mode.

The electronic apparatus according to the embodiment will be described with reference to the drawings.

[Hardware Configuration]

Figure 1:
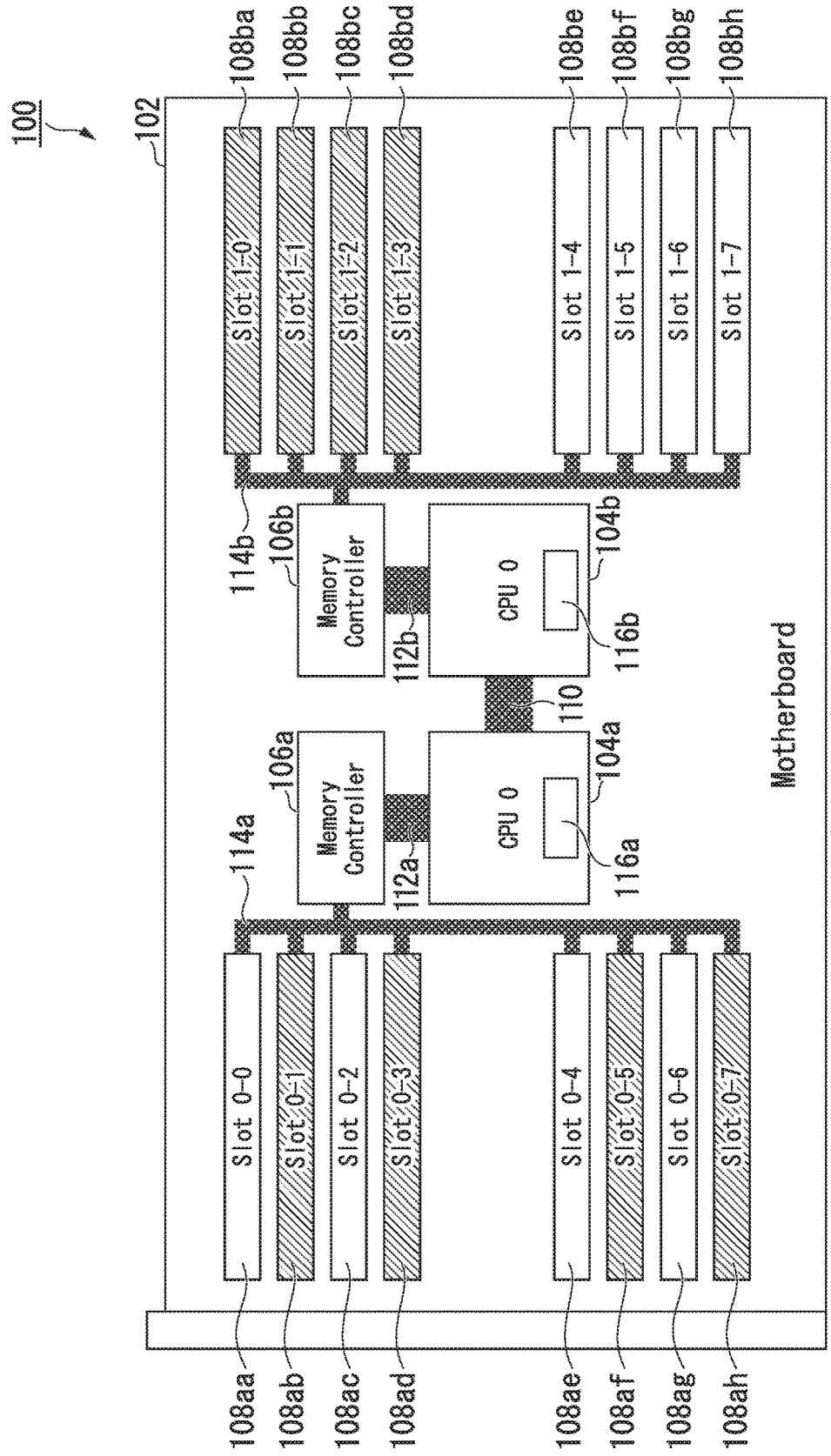
FIG. 1 illustrates an electronic apparatus according to the present embodiment.

FIG. 1 illustrates an electronic apparatus according to an embodiment.

The electronic apparatus 100 includes a motherboard 102, a CPU 104a, a memory controller 106a, a slot 108aa, a slot 108ab, a slot 108ac, a slot 108ad, a slot 108ae, a slot 108af, a slot 108ag, and a slot 108ah.

Further, the electronic apparatus 100 includes a CPU 104b, a memory controller 106b, a slot 108ba, a slot 108bb, a slot 108bc, a slot 108bd, a slot 108be, a slot 108bf, a slot 108bg, and a slot 108bh.

The CPU 104a and the CPU 104b are connected via a first bus 110. The CPU 104a includes a memory control register 116a therein, and the CPU 104b includes a memory control register 116b therein.

The memory controller 106a and the CPU 104a are connected via a second bus 112a. The memory controller 106b and the CPU 104b are connected via a second bus 112b.

Hereinafter, the CPU 104a and the CPU 104b are referred to as CPU 104 when they are not distinguished, and the memory controller 106a and the memory controller 106b are referred to as memory controller 106 when they are not distinguished. Also, the slot 108aa, the slot 108ab, the slot 108ac, the slot 108ad, the slot 108ae, the slot 108af, the slot 108ag, and the slot 108ah will be described as slot 108a when they are not distinguished. Similarly, the slot 108ba, the slot 108bb, the slot 108bc, the slot 108bd, the slot 108be, the slot 108bf, the slot 108bg, and the slot 108bh are referred to as slot 108b when they are not distinguished. The slots 108a and 108b will be described as slot 108 when they are not distinguished.

On the motherboard 102, the CPU 104, the memory controller 106, and slot 108 are mounted. A memory module is mounted in slot 108. Slot 108 is an interface for accessing the memory module mounted in slot 108 as a main storage area or a secondary storage area.

The memory module includes a board, one or more memory chips, and connection terminals for mounting the one or more memory chips and connecting to the computer.

The physical shape of slots 108 may conform to a standard such as a dual inline memory module (DIMM) or a small outline dual inline memory module (SO-DIMM), but the present invention is not limited thereto. For example, the physical shape of the slot 108 may be a shape conforming to a successor standard of the DIMM or SO-DIMM.

Each of the one or multiple memory chips and CPU 104 are connected by components conforming to standards such as a double data-rate 3 synchronous dynamic random access memory (DDR3-SDRAM), DDR4-SDRAM, low power double-data-rate 3 (LPDDR3), or LPDDR4, but the present invention is not limited thereto. For example, each of the one or multiple memory chips and the CPU 104 may be connected by an electrical interface or the like defined by successor standards of DDR3-SDRAM, DDR4-SDRAM, LPDDR3, or LPDDR4.

The memory module may include non-volatile memory devices such as magneto-resistive RAM (MRAM), spin transfer torque (STT)-MRAM, ferroelectric RAM (Fe-RAM), resistance RAM (ReRAM), or phase change RAM (PCRAM) can be applied. Also, the memory modules to be inserted into the slots may be memory modules including homogeneous non-volatile memory devices, or memory modules including heterogeneous non-volatile memory devices.

Hereinafter, a case in which a memory module including an STT-MRAM is mounted in slot 108 will be described.

Also, the memory module is not limited to a memory module mounted in slot 108 and connected to the motherboard 102. The memory module may be fixed to the motherboard 102 or may be connected to the motherboard 102 by wiring.

[Functional Configuration]

Figure 2:
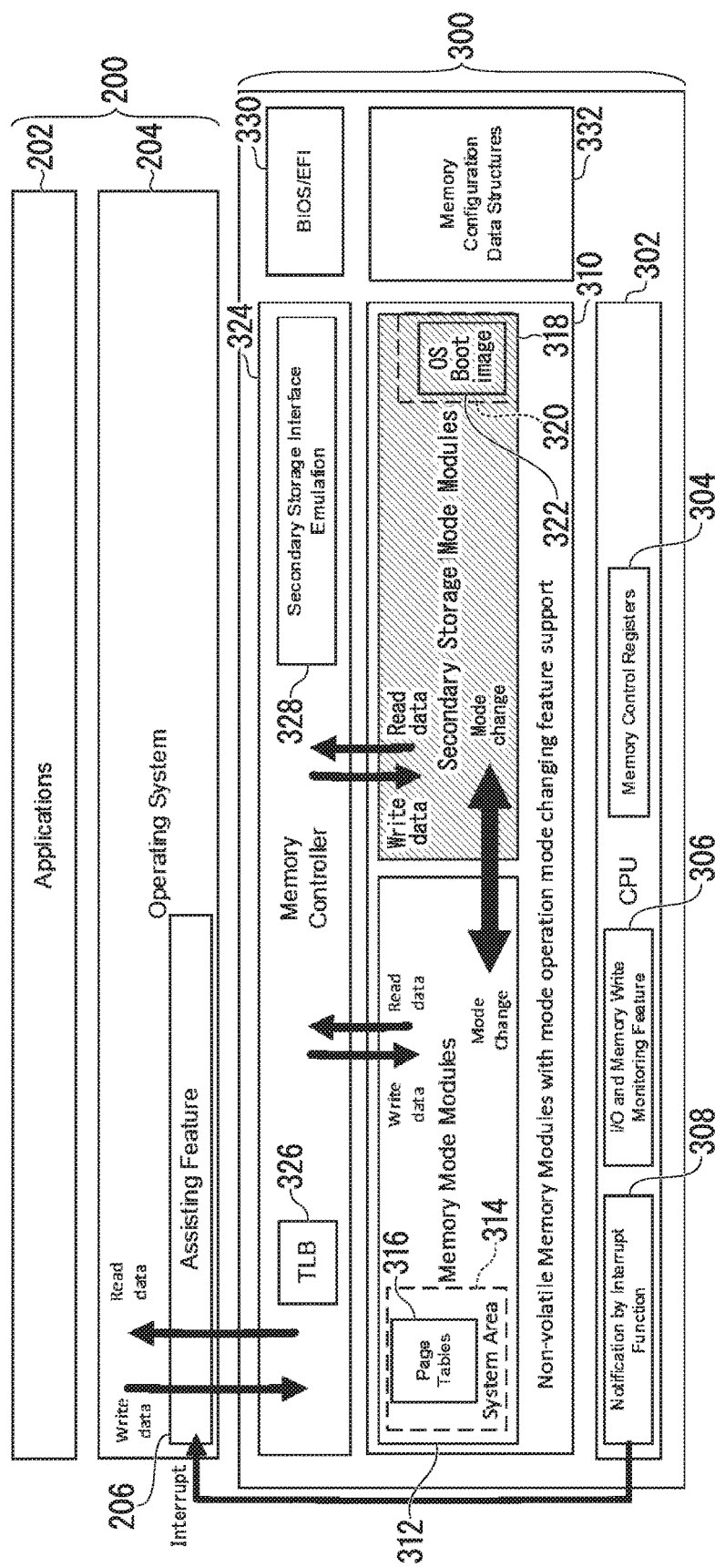
FIG. 2 is a block diagram of the electronic apparatus according to the present embodiment.

FIG. 2 illustrates an example of functions of the electronic apparatus 100 according to the present embodiment. As illustrated in FIG. 2, functions of the electronic apparatus 100 are divided into the first layer 300 and the second layer 200. Here, it is assumed that memory modules are mounted in each of the slots 108.

The second layer 200 includes an application 202 and an operating system 204. The application 202 and the operating system 204 are executed by CPU 302. The operating system 204 provides an interface abstracting hardware for each function to the user or the application 202. The application 202 is executed using APIs and logical memory space provided by the operating system 204.

The first layer 300 includes CPU 302, non-volatile memory 310, memory controller 324, basic input/output system (BIOS)/extensible firmware interface (EFI) 330, and memory configuration data structures 332.

CPU 302 corresponds to CPU 104 in FIG. 1 and includes memory control registers 304 corresponding to the memory control registers 104 in FIG. 1. CPU 302 includes function (notification by interrupt function) 308 that notifies the operating system 204 of interrupt and I/O and memory write monitoring feature 306.

The minimum access unit of the non-volatile memory 310 is one byte, but the present invention is not limited thereto. For example, the minimum access unit of the non-volatile memory 310 may be one bit. Also, the non-volatile memory 310 can be accessed in units of blocks, one block corresponding to a certain number of bytes or a certain number of bits.

The memory controller 324 maps the logical address to each physical address of the first storage region of the non-volatile memory 310 and to each physical address of the second storage region of the non-volatile memory 310.

Hereinafter, the operational mode of the first storage region of the non-volatile memory 312 is referred to as a main storage (operation) mode. The operational mode of the second storage region of the non-volatile memory 310 is referred to as a secondary storage (operation) mode.

That is, the first storage area is used as a main storage area in which a program in execution is stored, and the second storage area is used as a secondary storage area in which a program not in execution is stored.

The memory controller 324 sets one or multiple memory modules of the non-volatile memory 310 as memory modules 312 in the main storage mode and another one or multiple memory modules of the nonvolatile memory 310 as memory modules 318 in the secondary storage mode.

In the system area 314 of the memory modules 312 in the main storage mode, page tables 316 are stored. Page tables 316 are tables that indicate mappings between logical addresses and physical addresses.

In the system area 320 of the memory modules 318 in the secondary storage mode, the OS boot image 322 is stored. The OS boot image 322 is obtained by storing contents and structure of file system of the operating system 204 in files.

The memory controller 324 corresponds to memory controller 106 in FIG. 1 and includes a TLB (Translation Lookaside Buffer) 326 and secondary storage interface emulation feature 328.

The TLB 326 caches recently-used mapping relationships between the logical addresses and the physical addresses stored in the page tables 316, in order to carry out transformation of addresses at higher speeds.

The secondary storage interface emulation feature 328 enables access to the memory modules 318 in the secondary storage mode by emulating an interface that is used for secondary storage, such as Serial Advanced Technology Attachment (SATA), serial attached Small Computer System Interface (SCSI), Serial Attached SCSI (SAS), Non-Volatile Memory Express (NVMe), or Peripheral Component Interconnect (PCI) Express (PCIe).

The BIOS is a firmware that executes hardware initialization during boot-up process. The EFI may be an alternative of BIOS and provides an interface between the operating system 204 and platform firmware.

Memory setting data are included in the memory configuration data structure 332.

The operating system 204 executes various programs including application 202. Also, the operating system 204 can call the assisting feature 206. The assisting feature 206 requests the memory controller 324 to read data and write data when interrupt is triggered by function 308 that uses CPU 302 to generate interrupts for notification purposes.

Upon detecting a request (of the first type) for writing data to the main storage area made by the operating system 204, the memory controller 324 writes the data requested to be written to the memory modules 312 that are set to main storage mode.

When the operating system 204 makes a request (of the second type) for writing (e.g., copying) the data stored in the main storage area to the secondary storage area, the memory controller 324 switches the storage mode of the main storage area where the data requested to be written is stored from main storage mode to secondary storage mode.

When the operating system 204 makes a request (of the third type) for writing (e.g., copying) the data stored in the secondary storage area to the main storage area, the memory controller 324 switches the storage mode of the secondary storage area in which the data requested to be written is stored from secondary storage mode to main storage mode.

As an example, a case when storage mode is switched in units of a single memory module will be described hereinafter.

The CPU 302 includes multiple registers, which corresponds to the memory control register 304 in FIG. 2. For example, the CPU 302 has as many register bits as the number of memory modules with non-volatile memory 310.

The registers include a storage mode configuration register 1002, a storage mode state register 1004, and a spare module register 1006. The storage mode configuration register 1002 is a register for setting a storage mode of each memory module. The storage mode state register 1004 is a register indicating a current storage mode of each memory module. The spare module register 1006 is a register with which each memory module can be set as a spare module.

Figure 3:
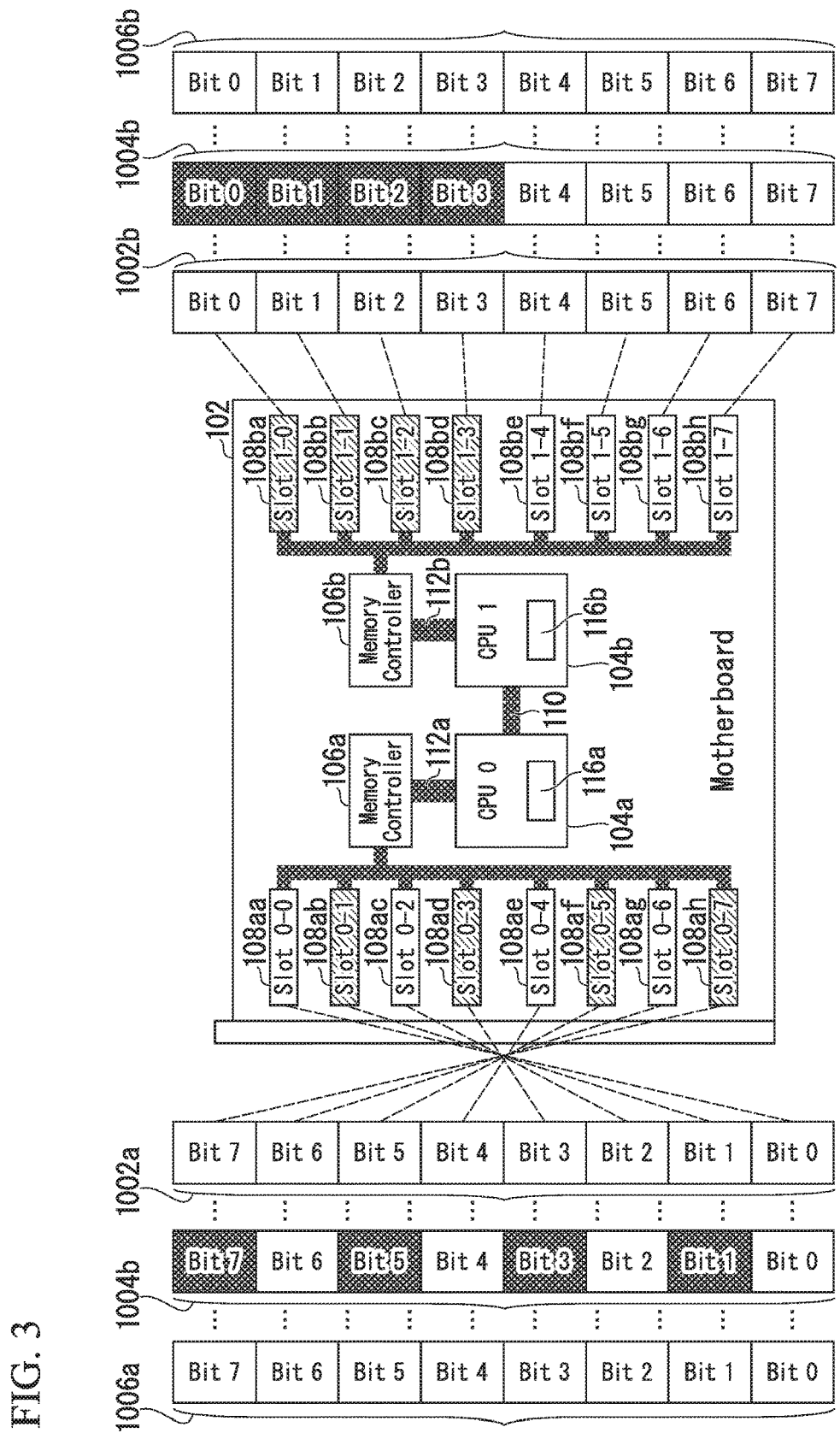
FIG. 3 illustrates a register of the electronic apparatus according to the present embodiment.

FIG. 3 illustrates an example of the storage mode configuration register 1002, the storage mode state register 1004, and the spare module register 1006. A value stored in each of the bits in the storage mode configuration register 1002, the storage mode state register 1004, and the spare module register 1006 corresponds to one of the slots 108.

More specifically, one of bits "Bit 0" to "Bit 7" in the storage mode configuration register 1002a, one of bits "Bit 0" to "Bit 7" in the storage mode state register 1004a, and one of bits "Bit 0" to "Bit 7" in the spare module register 1006a are associated with a corresponding slot in the multiple slots 108a. The same is true for each of the multiple slots 108b.

When the value "0" is set in one of the bits "Bit 0" to "Bit 7" in the storage mode configuration register 1002, the storage mode of the memory module mounted in the slot associated with the one of the bits "Bit 0" to "Bit 7" in which the value "0" is set is set to main storage mode.

On the other hand, when the value "1" is set in one of the bits "Bit 0" to "Bit 7" in the storage mode setting register 1002, the storage mode of the memory module mounted in the slot associated with the one of the bits "Bit 0" to "Bit 7" in which the value "1" is set is set to secondary storage mode.

When the value "0" is set in one of bits "Bit 0" to "Bit 7" in the storage mode state register 1004, it indicates that the storage mode of the memory module mounted in the slot associated with one of the bits "Bit 0" to "Bit 7" in which the value "0" is set is currently configured to main storage mode.

On the other hand, when the value "1" is set in one of the bits "Bit 0" to "Bit 7" in the storage mode state register 1004, it indicates that the storage mode of the memory module mounted in the slot associated with one of the bits "Bit 0" to "Bit 7" in which the value "1" is set is currently configured to secondary storage mode.

When the value "0" is set in one of the bits "Bit 0" to "Bit 7" in the spare module register 1006, the memory module mounted in the slot associated with the one of the bits "Bit 0" to "Bit 7" in which the value "0" is set is configured so that the memory module does not operate as a spare module.

On the other hand, when the value "1" is set in one of the bits "Bit 0" to "Bit 7" in the spare module register 1006, the memory module mounted in the slot associated with the one of the bits "Bit 0" to "Bit 7" in which the value "1" is set is configured so that the memory module operates as a spare module.

Figure 4:
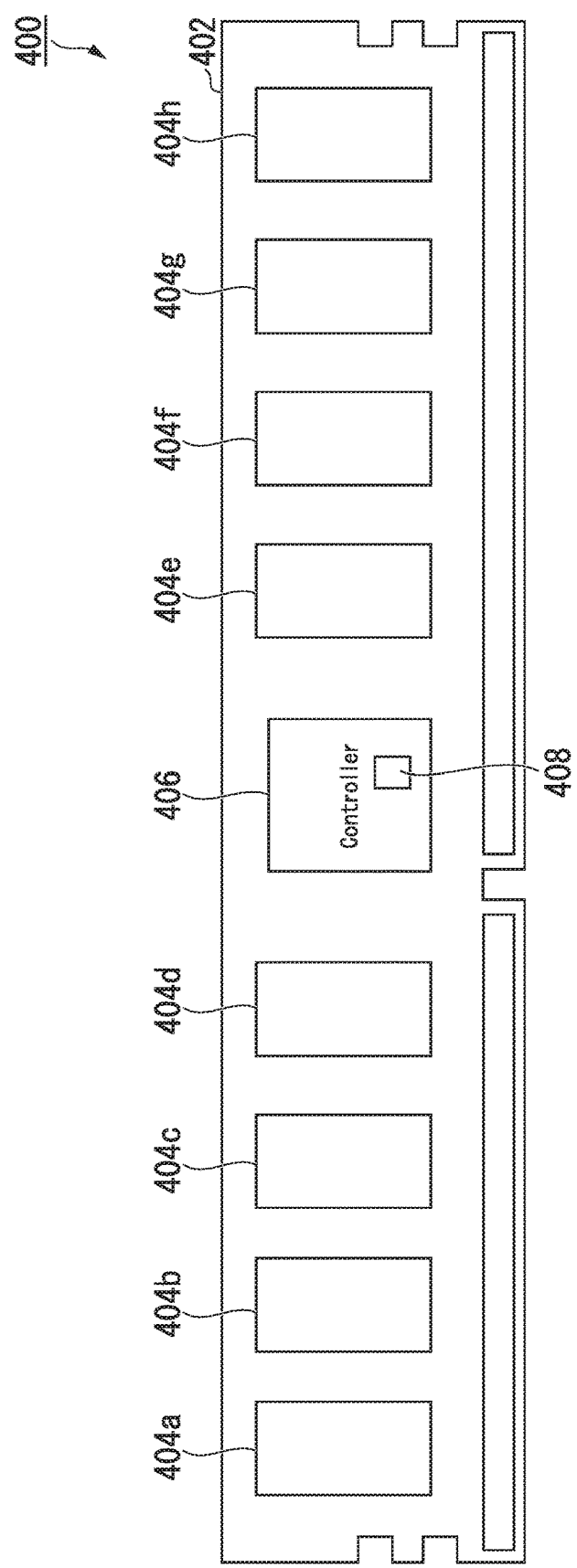
FIG. 4 illustrates an example of a memory module mounted on the electronic apparatus according to the present embodiment.

FIG. 4 illustrates an example of the memory module. In the memory module 400, memory chips 404a to 404h and a controller 406 are mounted on a board 402. The controller 406 includes a mode setting bit storage unit 408. The mode setting bit storage unit 408 stores the storage mode of the memory module 400.

The storage mode of the memory module indicated by the storage mode state register 1004 shall be the same as the value set in the mode setting bit storage unit 408 built in the controller 406 of the memory module 400.

CPU 302 accesses the storage mode configuration register 1002, the storage mode state register 1004, and the spare module register 1006, and reads the values. Also, CPU 302 writes values to the storage mode configuration register 1002 and the spare module register 1006. The value of the storage mode configuration register 1002 may be set by a user referring to a menu provided by BIOS function.

Figure 5:
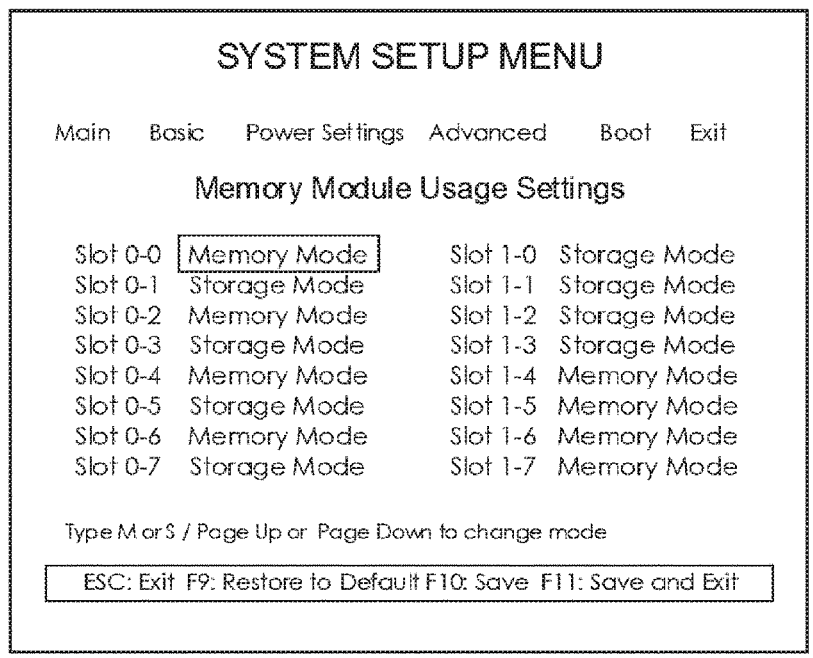
FIG. 5 illustrates an example of storage mode and memory mode configuration screen for the electronic apparatus according to the present embodiment.

FIG. 5 illustrates an example of a screen for setting the storage mode of the memory module. When the CPU 302 executes the BIOS, a system setup menu is displayed and the user can set values of the storage mode configuration register 1002.

CPU 302 can set a memory module where the value in corresponding bit of storage mode configuration register 1002 is "1" as a spare module by setting the corresponding bit of the spare module register 1006 to value "1". That is, when the value "1" is set in the corresponding bit of the bits "Bit 0" to "Bit 7" of both the storage mode state register 1004 and the spare module register 1006, the corresponding memory module operates as a spare module.

A memory module configured as a spare module can operated in either main storage mode or the secondary storage mode.

The electronic apparatus 100 can switch storage modes regardless of the state of operating system 204. Thus, storage modes can be switched when operating system 204 is running and when operating system 204 is not running. Also, regardless of the fact that whether the hypervisor is running or not, the storage mode can be switched.

The configuration of storage mode and the relationship between the physical address and the slot number may be included in the memory configuration data structure 332 managed by the BIOS.

The relationship between the slot number and the physical address may be stored in the memory configuration data structure 332 in accordance with industry standards for memory modules. Industry standards for memory modules may be serial presence detect (SPD) or the like. The data structure managed by the BIOS may be system management BIOS (SMBIOS)/desktop management interface (DMI) or the like.

The operating system 204 or the hypervisor acquires the physical address to be allocated to a storage area of the memory module and the storage mode of the memory module from an interface. An example of the interface is an SPD interface. An example of the data structure managed by the BIOS is SMBIOS/DMI. When the storage mode is switched, the CPU 302 or the interface updates the storage mode to the latest mode.

When the program is executed, hardware such as the CPU 302 and the memory controller 324 recognizes memory modules in the main storage mode as the main storage area and recognizes memory modules in the secondary storage mode as the secondary storage area.

[Page Table]

Processes and programs that run on the operating system 204 operate in accordance with a logical address space starting at 0x00000000. The logical address space is different from the physical address space of memory module 400. The system process of operating system 204 and process of application 202 access the memory module 400 using a logical address in the logical address space.

By executing the operating system 204, virtual storage is realized by CPU 302. By utilizing virtual storage, it is possible to provide a plurality of logical address spaces that are mapped to one physical address space for different processes. Not only the main storage area but also a swap area of the secondary storage area can be used for operations of the operating system 204.

Figure 6:
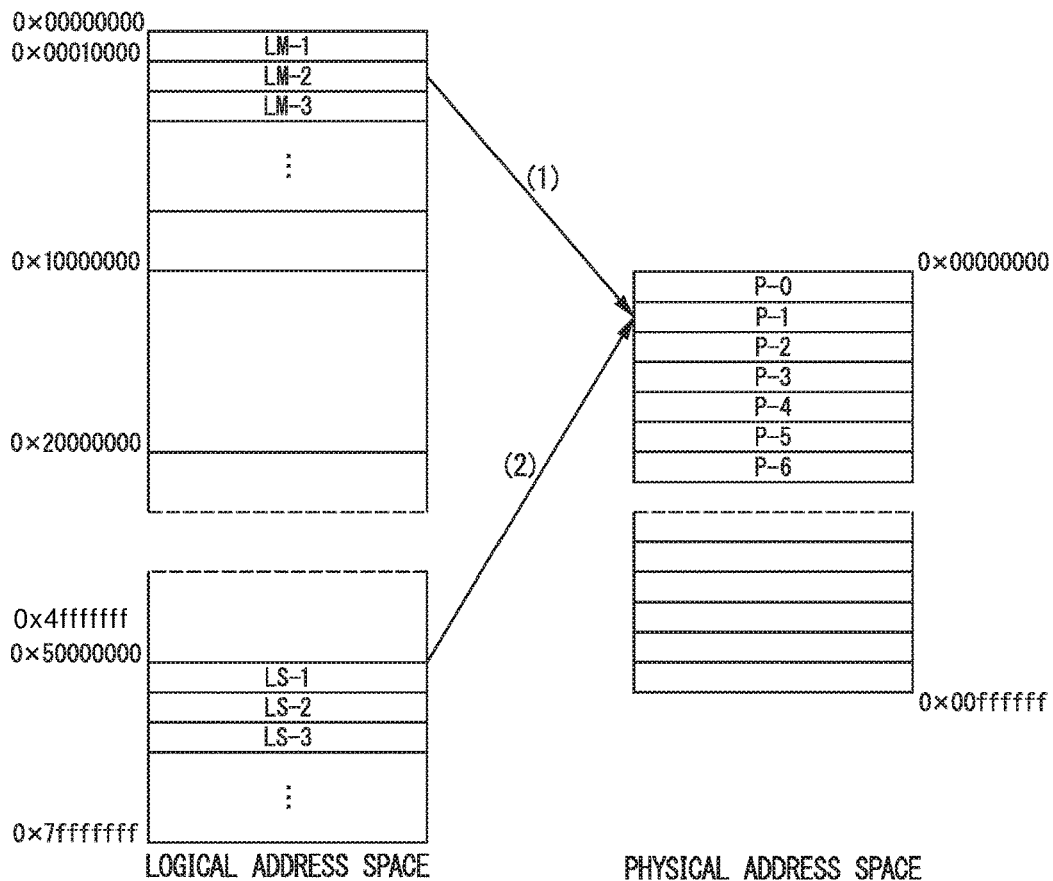
FIG. 6 illustrates an example of correspondence between logical address space and physical address space in the electronic apparatus according to the present embodiment.

FIG. 6 illustrates an example of relationship between logical page addresses and physical page addresses. The memory modules are managed in units of a data size such as 4 KB, 2 MB, or 4 MB, which are called pages. The logical address space includes pages associated with the memory modules 312 in the main storage mode and pages associated with the memory modules 318 in the secondary storage mode. A page of the logical address space and a page of the physical address space are mapped in the page table 316.

In FIG. 6, logical addresses from "0x00000000" to "0x4fffffff" are associated with the memory modules 312 in the main storage mode. Also, logical addresses from "0x50000000" to "0x7fffffff" are associated with the memory modules 318 in the secondary storage mode. (1) in FIG. 6 indicates that a page "LM-1" in the logical address space is associated with a page "P-1" in the physical address space. (2) in FIG. 6 indicates that when a memory module including the page "P-1" in the physical address space is changed from the main storage mode to the secondary storage mode, a page in the logical address space corresponding to the page "P-1" in the physical address space is changed from "LM-1" to "LS-1".

Page table 316 is managed by operating system 204 and is referred when the operating system 204 accesses the memory modules 312 and 318 with non-volatile memory 310. Also, page table 316 is maintained with the support of memory controller 324.

Memory controller 324 stores TLB 326. TLB 326 is a cache that stores recently-used mappings between logical addresses and physical addresses. When a logical address is mapped to a physical address, the memory controller 324 first searches the TLB 326. When the logical address to be mapped is cached in the TLB 326, the memory controller 324 carries out mapping from the logical address to be mapped to the corresponding physical address based on the cached mapping. Thereby, the memory controller 324 can carry out the logical-to-physical mapping without referring to page table 316.

Data that cannot be written to the main storage area may be stored in a swap area of the secondary storage area. If necessary, as data in the main storage area are written (transferred) to the swap area of the secondary storage area (page out), data currently stored in the swap area are written (transferred) to the main storage area (page in).

Figure 7:
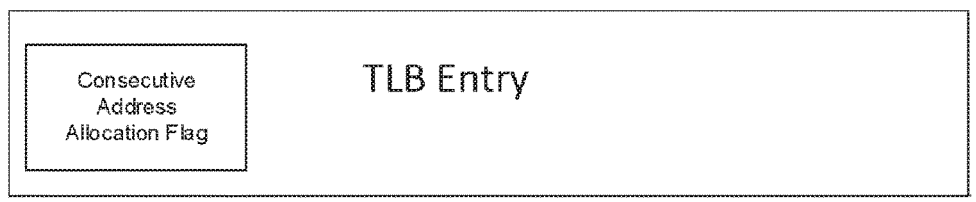
FIG. 7 illustrates an example of translation lookaside buffer (TLB) entry.
Figure 8:
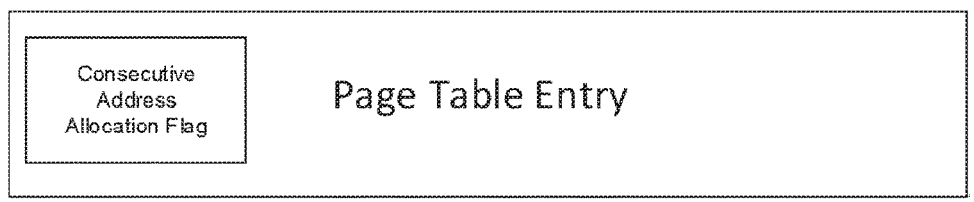
FIG. 8 illustrates an example of page table entry.

FIG. 7 illustrates an example of a TLB entry, which is an entry in the TLB 326. FIG. 8 illustrates an example of a page table entry (PTE), which is an entry in the page table 316. The TLB entry includes a field for setting a continuous physical address allocation flag. The PTE entry also includes a field for setting the continuous physical address allocation flag.

If there is a response from the memory controller 324 that it is possible to write data at continuous physical addresses, CPU 302 sets the continuous physical address allocation flag in a page table entry corresponding to each page in which the data can be written continuously in terms of physical address to "1". Further, CPU 302 sets the continuous physical address allocation flag in a TLB entry of each page in which the data can be written continuously in terms of physical address to "1". Thereby, CPU 302 can determine whether data are allocated to continuous physical addresses or conventional physical addresses allocation which may be discontinuous.

[First Operation of Electronic Apparatus 100]

Figure 9:
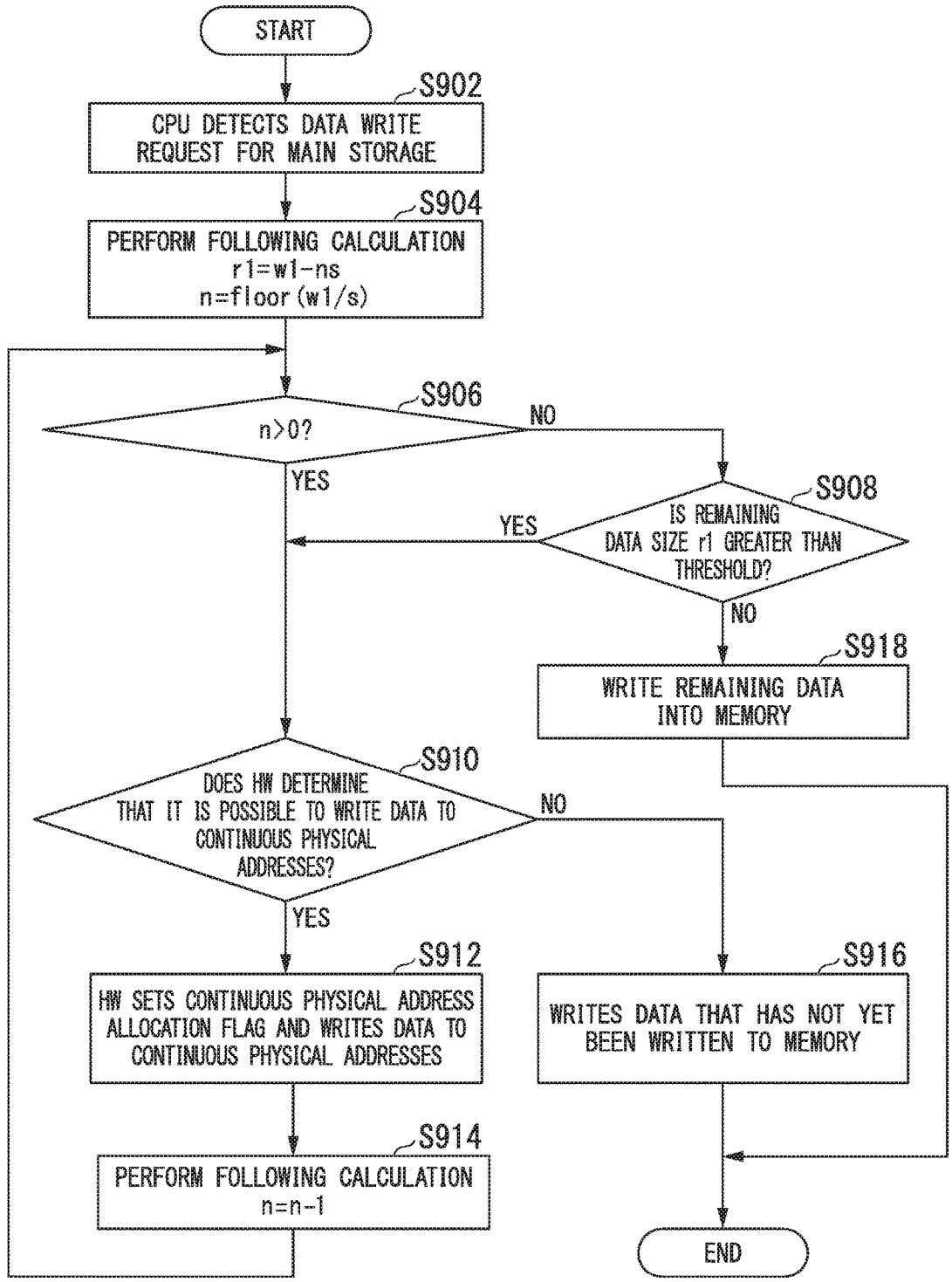
FIG. 9 is a flowchart illustrating an example of an operation (1) of the electronic apparatus according to the present embodiment.

FIG. 9 is a flow chart of an operation of the electronic apparatus 100.

"W1" indicates data size of data to be written to the memory modules 312 of non-volatile memory 310. "n" indicates the number of memory modules that are going to become full after writing the data. "n" is used as a counter value indicating the number of memory modules. "S" indicates a storage capacity per memory module. "r1" indicates a data size of remaining data that are going to be written to a memory module that does not become full after writing the data. "floor(x)" indicates the largest integer that does not exceed x. "T" indicates a threshold to determine whether data are going to be written to continuous physical addresses.

Figure 10:
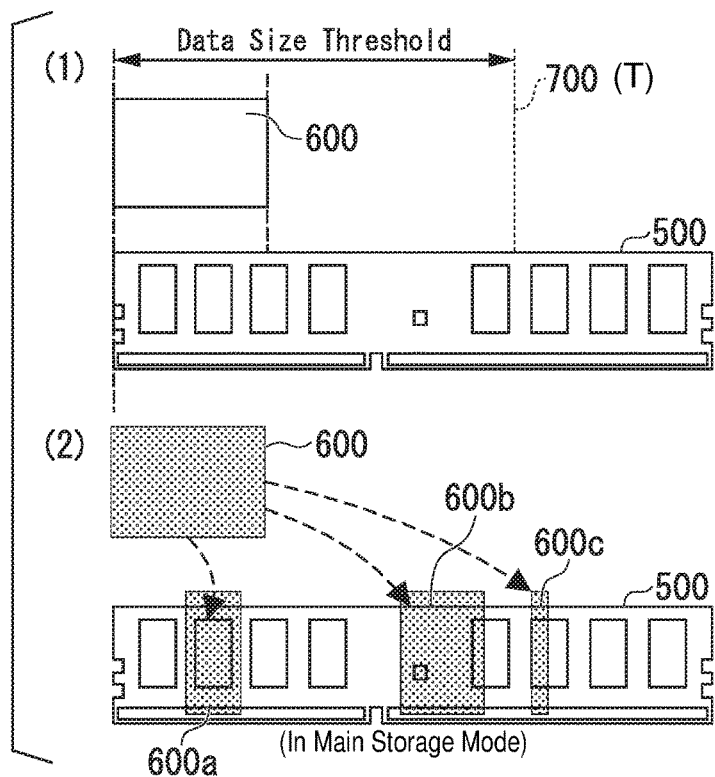
FIG. 10 illustrates an example of a process where data is written to the memory module by the electronic apparatus according to the present embodiment.

FIGS. 10 to 13 illustrate examples of data write operations to the memory modules of non-volatile memory 310. In FIGS. 10(1) to 13(1), reference numerals 600, 602, 604, and 606 indicate data requested to be written to the main storage area, and reference numerals 500, 502, 504, 506, 508, 510, and 512 indicate memory modules in the main storage mode. Returning to FIG. 9, steps of the operation will be described.

In step S902, the CPU 302 detects a request (request of the first type) for writing data to the main storage area, which is generated in by the operating system 204 process or the process of application 202. Here, the data size of the data to be written is described as "W1."

In step S904, the CPU 302 calculates the number of memory modules "n" where data will be written in the entire available storage area of the module and the data size r1 of the remaining data, if data is written in continuous physical addresses. The number of memory modules "n" where data will be written in the entire available storage area of the module is obtained from an integer part of W1/S, and the data size r1 of the remaining data is obtained by calculating W1−n×S.

Figure 12:
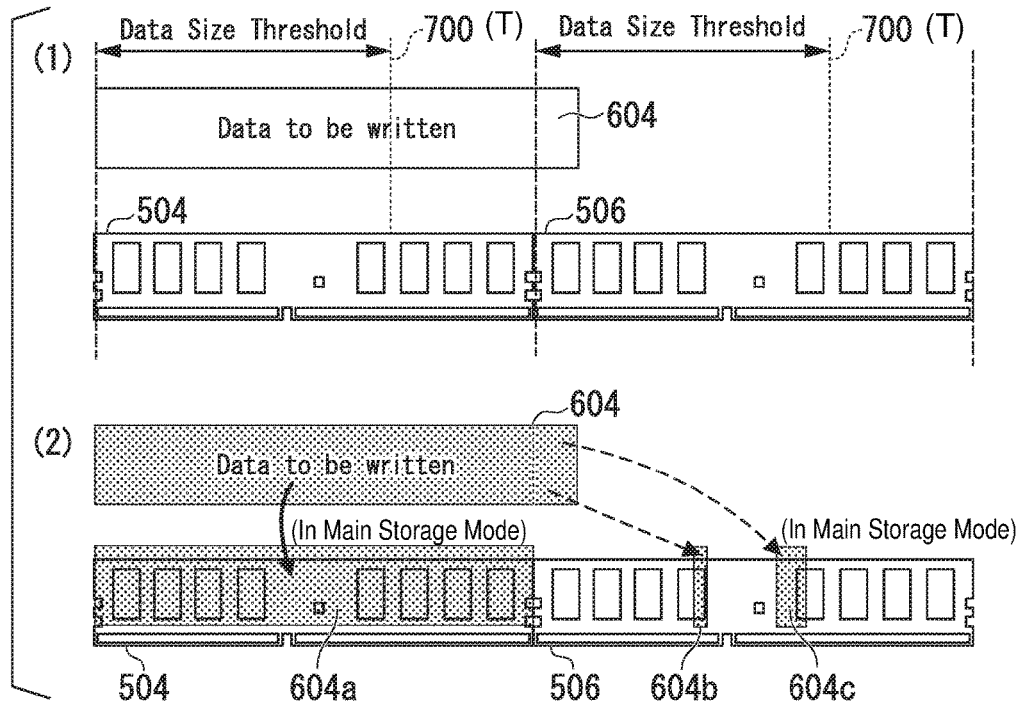
FIG. 12 illustrates an example of a process where data is written to the memory module by the electronic apparatus according to the present embodiment.
Figure 13:
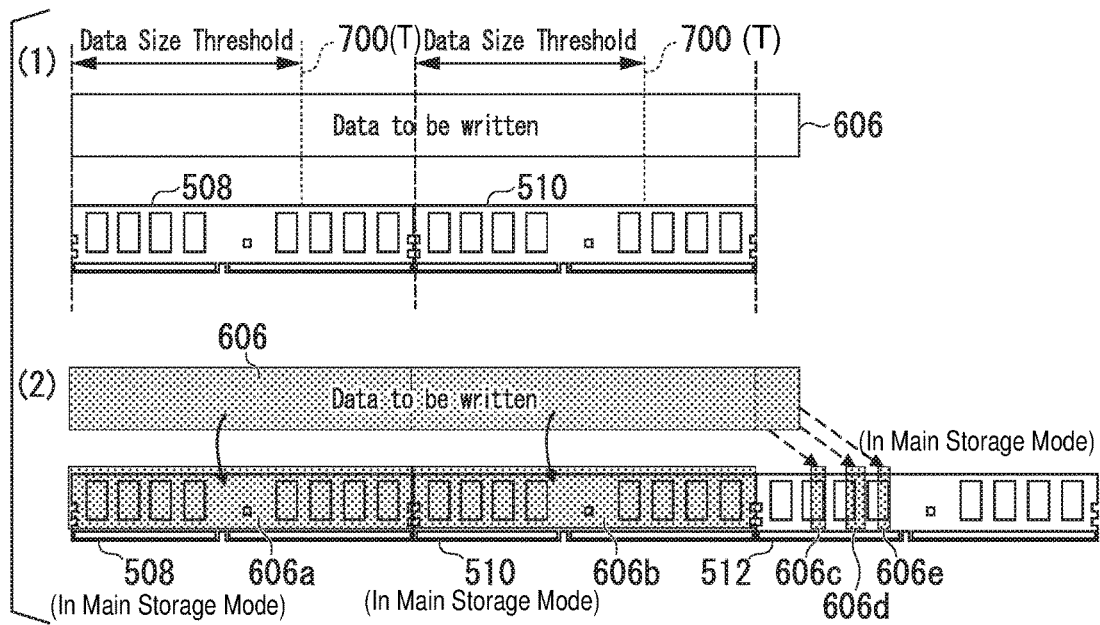
FIG. 13 illustrates an example of a process where data is written to the memory module by the electronic apparatus according to the present embodiment.

In step S906, the CPU 302 determines whether the number of memory modules "n" where data will be written in the entire available storage area of the module is greater than 0 or not. In the cases of FIGS. 10(1) and 11(1), the memory controller 324 determines that the number of memory modules "n" is 0. In the cases of FIG. 12(1) and FIG. 13(1), the memory controller 324 determines that the number of memory modules "n" is greater than 0.

Figure 11:
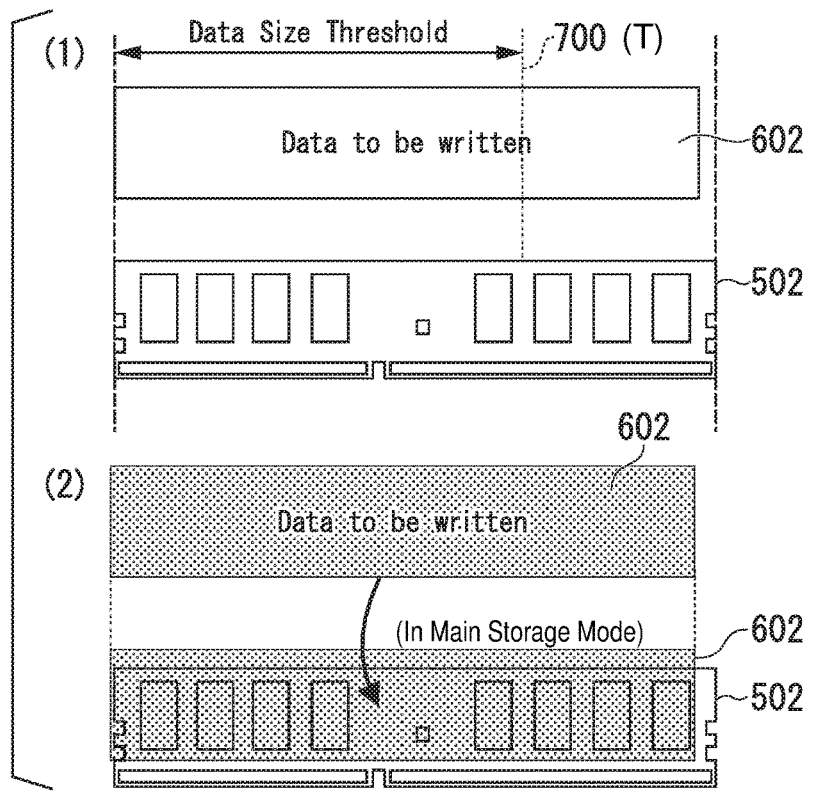
FIG. 11 illustrates an example of a process where data is written to the memory module by the electronic apparatus according to the present embodiment.

In step S908, the memory controller 324 determines whether the data size r1 of the remaining data is greater than or equal to the threshold T or not when it is determined that value of n is 0 in step S906. In the case of FIG. 10(1), the memory controller 324 determines that the data size r1 of data 600 is less than the threshold T. In the case of FIG. 11(1), the memory controller 324 determines that the data size r1 of data 602 is greater than or equal to the threshold T.

Here, the threshold T is a reference value that is used to determine whether data will be transferred via a memory bus or not. The threshold T may be 0.5 times or more a size of a unit storage area of mode switch, namely mode change from main storage mode to secondary storage mode or from secondary storage mode to main storage mode. However, the present invention is not limited thereto. For example, the threshold T may be 1.0 times or 2.0 times the size of the unit storage area of mode switch.

Step S910 is executed when it is determined that n is greater than 0 in step S906 and when it is determined that the data size r1 is larger than or equal to the threshold T in step S908. In step S910, the CPU 302 inquires the memory controller 324 whether data can be written to continuous physical addresses of the main storage area or not. Then, the CPU 302 determines whether the answer from the memory controller 324 to the inquiry is affirmative or not.

Step S912 is executed when the response from the memory controller 324 to the inquiry is affirmative in step S910. In step S912, CPU 302 sets the continuous physical address allocation flag when the page table entry and the TLB entry of the corresponding page are updated. The memory controller 324 writes data to the memory modules 312 in main storage mode. In the case of FIG. 11(2), the memory controller 324 writes the data 602 to continuous physical addresses of the memory module 502 in main storage mode.

In step S914, the CPU 302 subtracts 1 from the value of n. Thereafter, the process proceeds to step S906.

Step S916 is executed when the response to the inquiry is not affirmative in step S910. In step S916, the memory controller 324 writes the data to the memory modules 312 in main storage mode. In this case, the memory controller 324 may write data in conventional methods which may be in discontinuous physical addresses. In the example illustrated in FIG. 12(2), the memory controller 324 divides data 604 into data 604a, data 604b, and data 604c. Then the memory controller 324 writes the data 604a in the entire storage area of a memory module 504 in the main storage mode, and writes the data 604b and the data 604c to discontinuous storage areas of a memory module 506 in the main storage mode. In the example illustrated in FIG. 13(2), the memory controller 324 divides data 606 into data 606a, 606b, data 606c, data 606d, and data 606e. Then, the memory controller 324 writes the data 606a in the entire storage area of a memory module 508 in the main storage mode, the data 606b in the entire storage area of a memory module 510 in the main storage mode, and the data 604c, the data 606d, and the data 606e to discontinuous storage areas of a memory module 512 in main storage mode.

Step S918 is executed when the data size r1 is determined to be smaller than the threshold T in step S908. In step S918, the memory controller 324 writes the remaining data r1 to one of the memory modules 312 in the main storage mode. In this case, the memory controller 324 may write portions of the remaining data to discontinuous storage areas, respectively. In the example illustrated in FIG. 10(2), the memory controller 324 divides data 600 requested to be written into data 600a, data 600b, and data 600c and writes the data 600a, the data 600b, and the data 600c to discontinuous storage areas of a memory module 500 in main storage mode, respectively.

[Second Operation of Electronic Apparatus 100]

Figure 14:
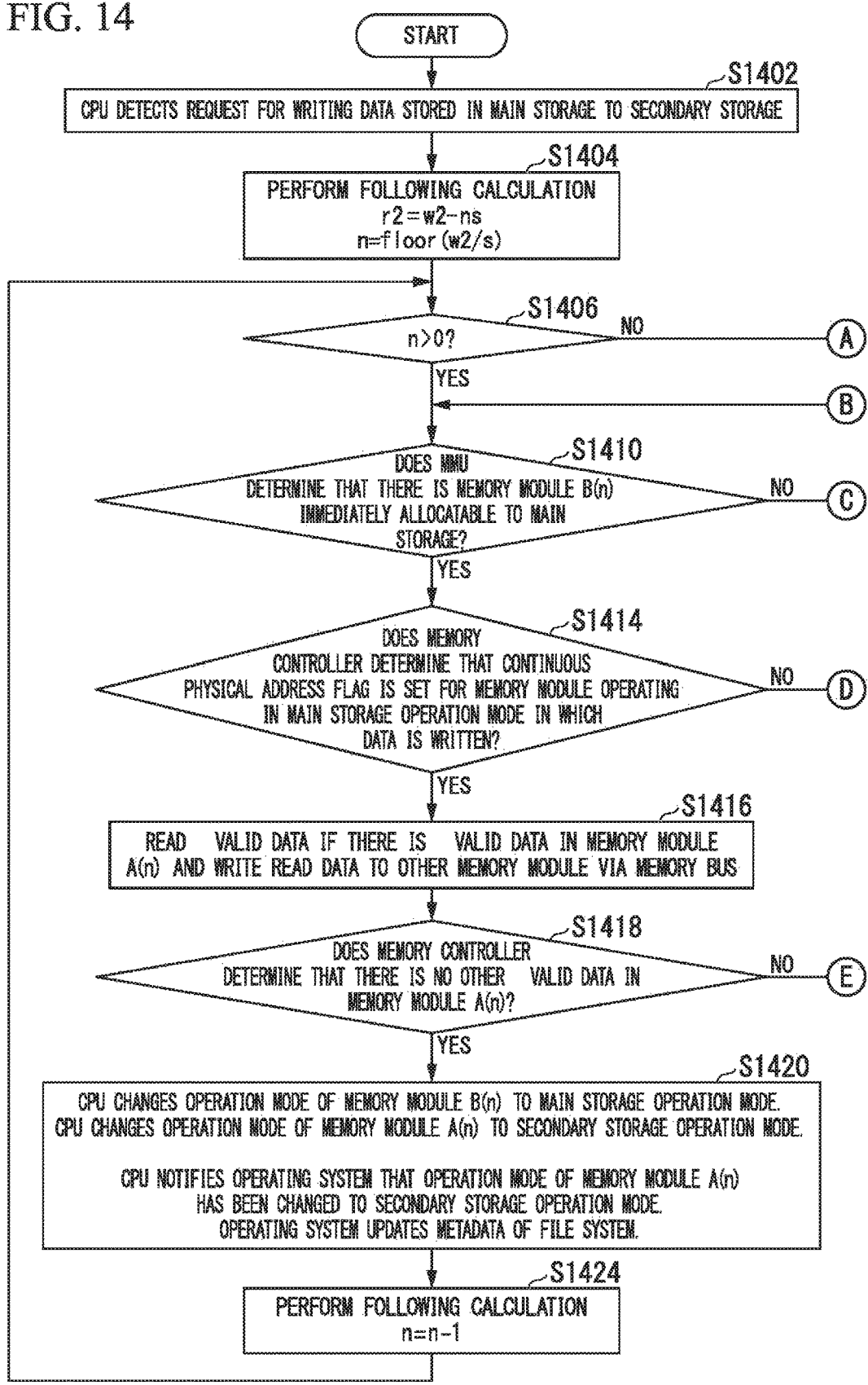
FIG. 14 is a flowchart illustrating an example of an operation (2-1) of the electronic apparatus according to the present embodiment.
Figure 15:
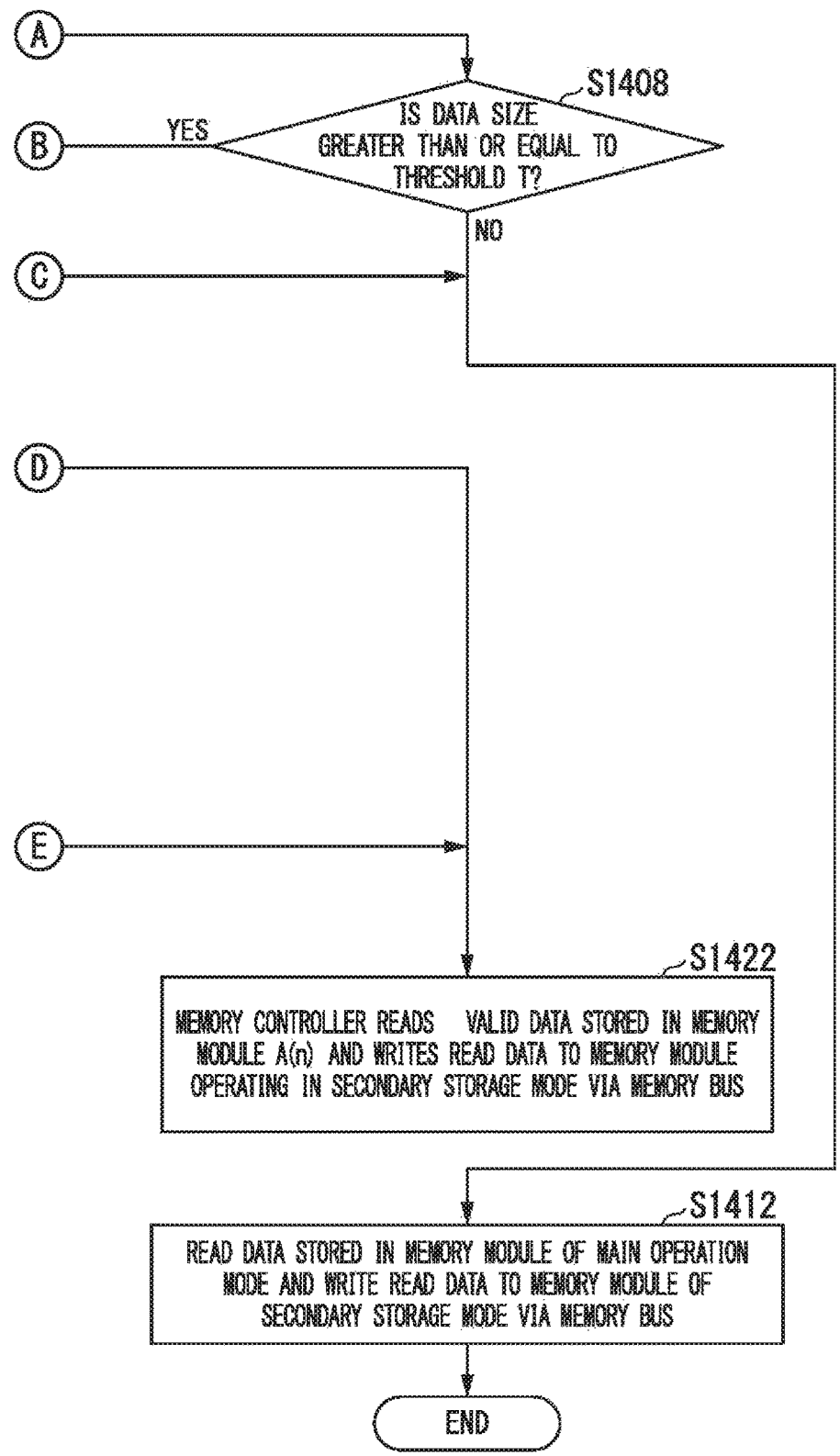
FIG. 15 is a flowchart illustrating an example of an operation (2-2) of the electronic apparatus according to the present embodiment.

FIGS. 14 and 15 are flowcharts of operations that write data stored in the main storage area to the secondary storage area.

"W2" indicates the size of data that will be written to the memory modules 318 set to secondary storage mode. "r2" indicates a size of remaining data for which data transfer is not performed by switching storage modes. "A( )" indicates the memory module to be swapped, namely modules where switching of storage modes is going to be carried out. "B( )" indicates the memory module allocated to memory space instead of memory module "A( )."

FIGS. 16 to 19 illustrate examples of data write operations to memory modules 312 of non-volatile memory 310.

Reference numerals 608, 610, 612, and 614 denote data requested to be written to the secondary storage area. Reference numerals 514, 516, 520, 522, 526, 528, and 530 denote memory modules originally in main storage mode, and reference numerals 515, 523, 532 denote memory modules originally in secondary storage mode.

In step S1402, CPU 302 detects a request for writing data to the secondary storage area, which is generated by the operating system 204 process, e.g., moving data from a memory-mapped space in the main storage area to swap space in the secondary storage area or closing of application 202. Here, the size of data to be written is "W2."

In step S1404, CPU 302 calculates the number of memory modules "n" where data will be written in the entire available storage area of the module and the data size r2 of the remaining portion of the data. The number of memory modules "n" where data will be written in the entire available storage area of the module is obtained from the integer part of W2/S, and the data size "r2" of the remaining data is obtained by calculating "W2−n×S."

Figure 16:
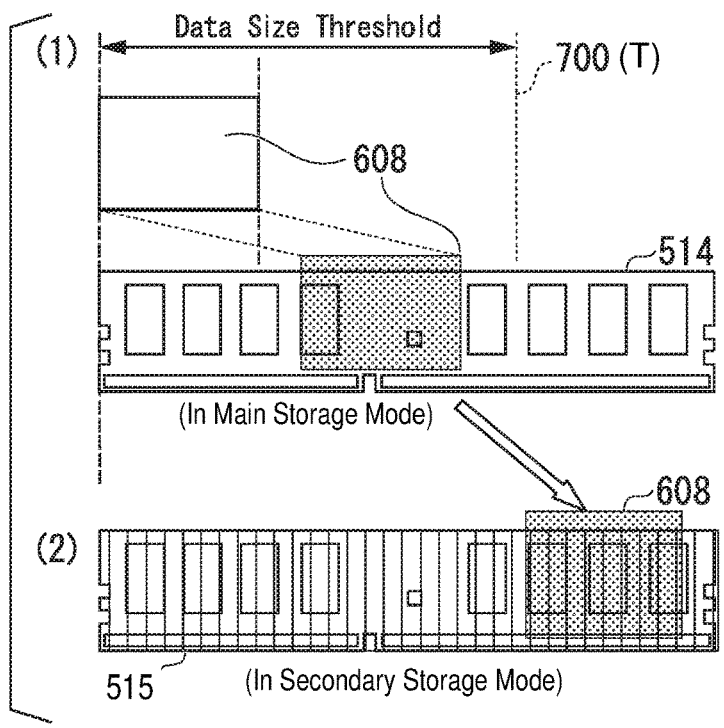
FIG. 16 illustrates an example of a process where data is written to the memory module by the electronic apparatus according to the present embodiment.
Figure 18:
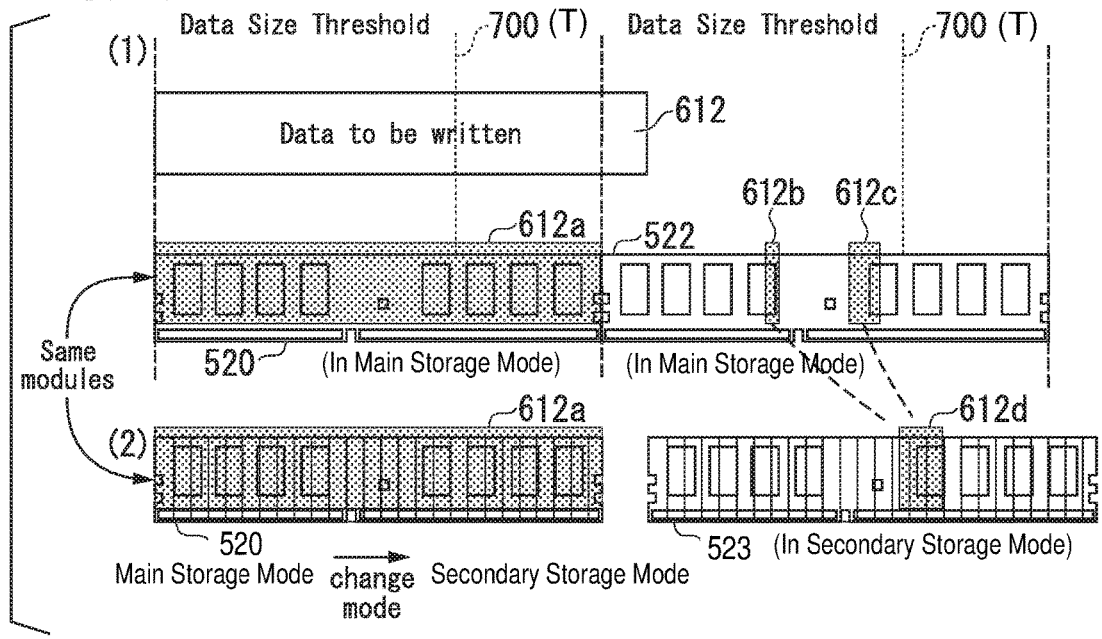
FIG. 18 illustrates an example of a process where data is written to the memory module by the electronic apparatus according to the present embodiment.

In step S1406, CPU 302 determines whether the number of memory modules "n" is greater than 0 or not. In the cases of FIGS. 16(1) and 17(1), the memory controller 324 determines that the number of memory modules "n" is 0. In the case of FIG. 18(1) and FIG. 19(1), the memory controller 324 determines that the number of memory modules "n" is greater than 0.

Figure 17:
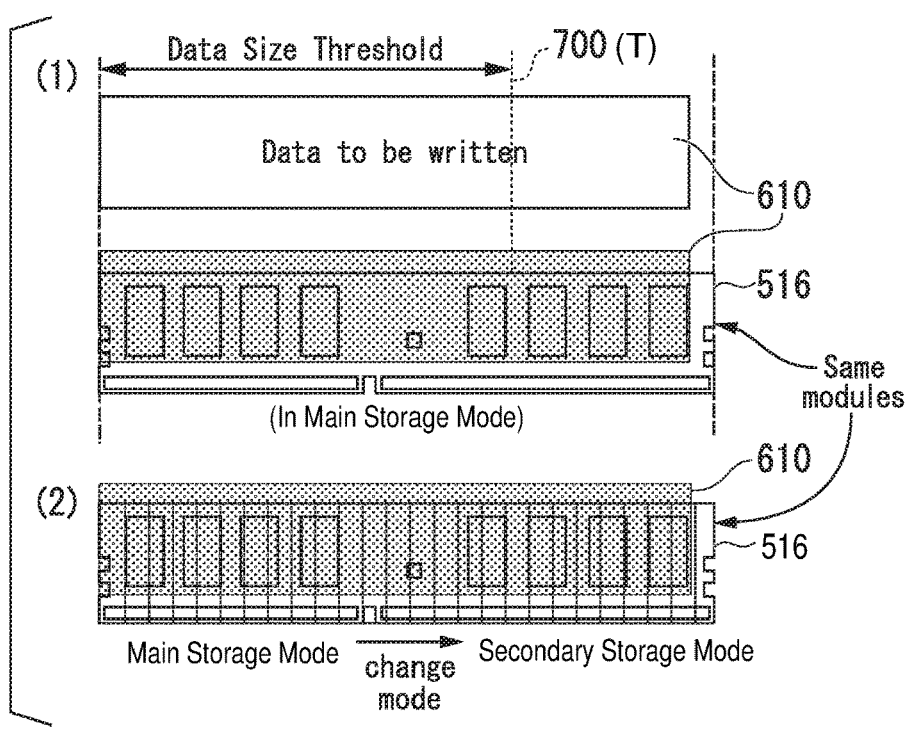
FIG. 17 illustrates an example of a process where data is written to the memory module by the electronic apparatus according to the present embodiment.

In step S1408, if n is 0, CPU 302 determines whether the data size r2 of the remaining data is greater than or equal to the threshold T or not. In the case of FIG. 16(1), the memory controller 324 determines that the data size r2 of the data 608 is less than the threshold T. In the case of FIG. 17(1), the memory controller 324 determines that the data size r2 of the data 610 is greater than or equal to the threshold T.

Step S1410 is executed when it is determined that n is greater than 0 in step S1406 and when it is determined that the data size r2 is greater than or equal to the threshold T in step S1408. In step S1410, CPU 302 inquires the memory controller 324 (a memory management unit (MMU)) whether there is an alternative memory module B(n) that can be set to main storage mode instead of memory module A(n) or not. Here, the memory module A(n) is a candidate for changing the storage mode from main storage mode to secondary storage mode. The memory module B(n) may be either a spare memory module or a memory module in secondary storage mode where no valid data is stored. As a result, although the total storage area of memory modules in main storage mode decreases due to storage mode switching of memory module A(n), from main storage mode to secondary storage mode, its impact can be minimized if it is possible to compensate by using another module B(n). Then, the CPU 302 determines whether the answer from the memory controller 324 to the inquiry is affirmative or not.

Step S1412 is executed when it is determined that the data size r2 is less than the threshold T in step S1408 and when it is determined that the answer from the memory controller 324 is not affirmative in step S1410. In step S1412, the operating system 204 instructs to write data stored in a memory module 312 in the main storage mode to memory module 318 in secondary storage mode via the memory bus. In the case of FIG. 16(2), the memory controller 324 writes (copies) the data 608 stored in the memory module 514 to continuous physical addresses of a memory module 515 in secondary storage mode via the memory bus.

Step S1414 is executed when it is determined that the answer from the memory controller 324 is affirmative in step S1410. In step S1414, the memory controller 324 determines whether the continuous physical address allocation flag is set or not in the page table entry or the TLB entry corresponding to the memory module 312 in main storage mode, where the data is stored. In FIG. 17(1), FIG. 18(1), and FIG. 19(1), the memory controller 324 determines that the continuous physical address allocation flag is set.

Step S1416 is executed when it is determined that the continuous physical address allocation flag is set in the page table entry or the TLB entry in step S1414. In step S1416, if valid data is stored in a memory module A(n), the memory controller 324 reads the valid data and writes the valid data to another memory module via the memory bus. In FIG. 18(2), the memory controller 324 performs a process of writing (copying) data 612d including remaining data 612b and remaining data 612c to continuous physical addresses of a memory module 523 in secondary storage mode.

In step S1418, the memory controller 324 determines whether there is no other valid data in memory module A(n) or not.

Figure 19:
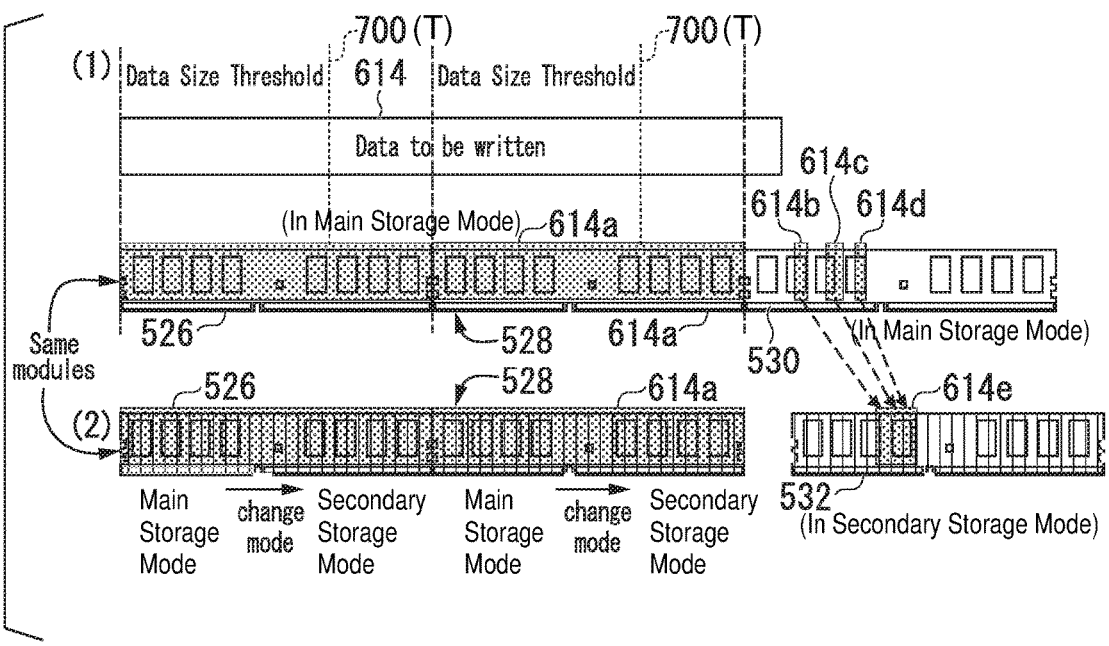
FIG. 19 illustrates an example of a process where data is written to the memory module by the electronic apparatus according to the present embodiment.

Step S1420 is executed when it is determined that there is no other valid data in the memory module A(n) in step S1418. In step S1420, memory controller 324 switches the storage mode of the memory module B(n) to main storage mode. In addition, memory controller 324 switches the storage mode of the memory module A(n) to secondary storage mode. Function 308 that provides notification of interrupt by CPU 302 informs operating system 204 of the interrupt and notifies that the storage mode of the memory module A(n) has been changed to secondary storage mode. In the case of FIG. 17(2), the memory controller 324 changes the storage mode of the memory module 516 that is in the main storage mode, where data 610 is stored, from main storage mode to secondary storage mode. In the case of FIG. 18(2), memory controller 324 changes the storage mode of the memory module 520 that is in main storage mode, where data 612a is stored, from main storage mode to secondary storage mode. In the case of FIG. 19(2), memory controller 324 changes the storage modes of memory module 526 and memory module 528 in main storage mode where data 614 is stored from main storage mode to secondary storage mode.

Operating system 204 that detects interrupt from CPU 302 updates the metadata of file system and changes configuration so that the data stored in memory module A(n) can be accessed from the file system used by operating system 204.

Here, memory module A(n) may be added to secondary storage area through hot add process, or by replacing with another memory module allocated to the secondary storage area.

Step S1422 is executed when it is determined that the continuous physical address allocation flag is not set in the page table entry or the TLB entry in step S1414 and when it is determined that valid data is stored in the memory module A(n) in step S1418. In step S1422, the memory controller 324 reads the valid data stored in the memory module A(n) and writes the valid data to the memory module 318 in the secondary storage mode via the memory bus. In the example illustrated in FIG. 18(2), the memory controller 324 writes data 612d including remaining data 612b and remaining data 612c to continuous physical addresses of a memory module 520 that is now switched to secondary storage mode.

In step S1424, CPU 302 subtracts 1 from the value of n after step S1420 or step S1422 is completed. Thereafter, the process proceeds to step S1406.

[Third Operation of Electronic Apparatus 100]

Figure 20:
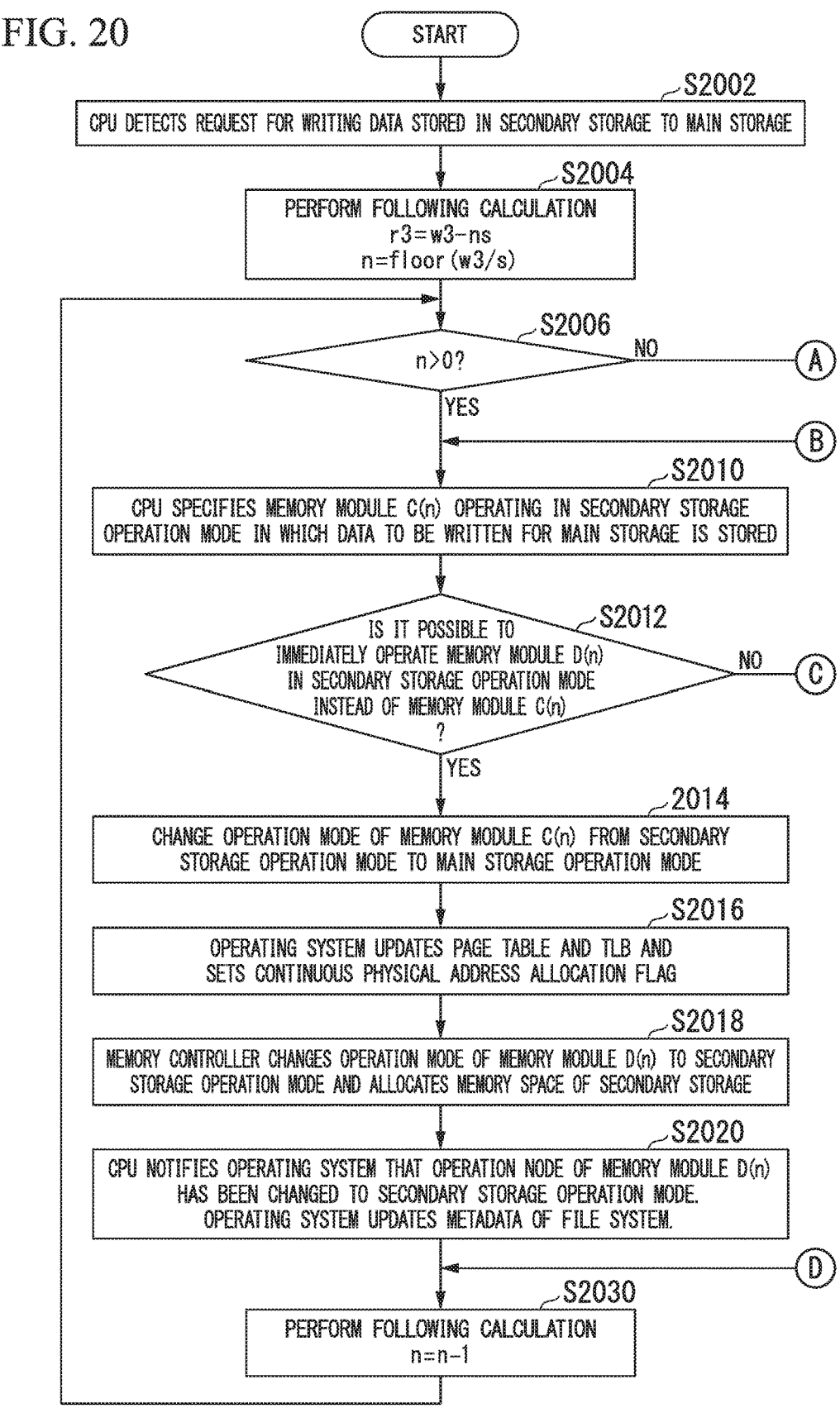
FIG. 20 is a flowchart illustrating an example of an operation (3-1) of the electronic apparatus according to the present embodiment.
Figure 21:
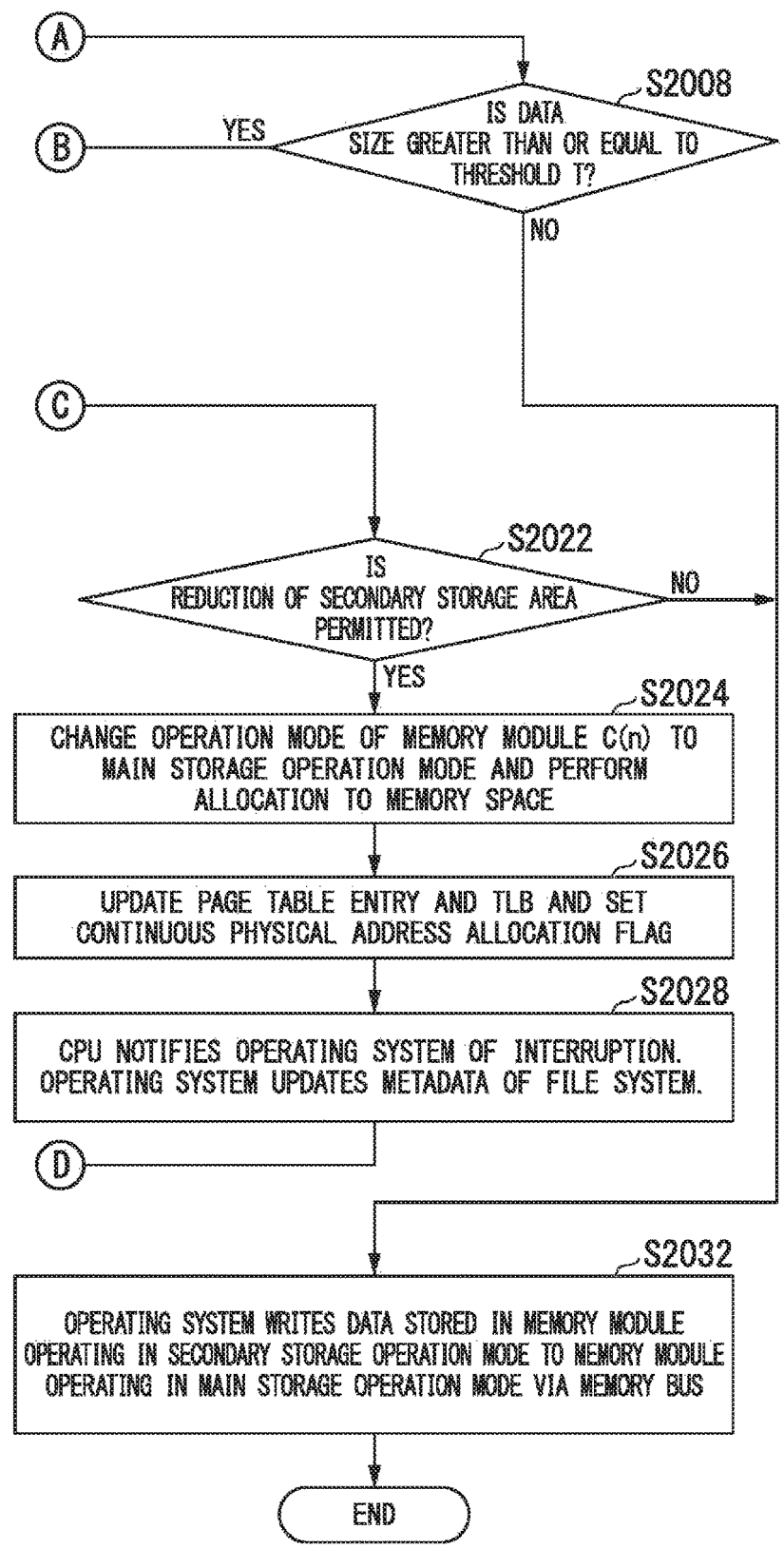
FIG. 21 is a flowchart illustrating an example of an operation (3-2) of the electronic apparatus according to the present embodiment.

FIGS. 20 and 21 are flow charts of data write operation from the secondary storage area to the main storage area.

"W3" indicates the size of data to be written to the memory module 312 of the non-volatile memory 310. "r3" indicates the data size of remaining data where data transfer is not performed by switching storage modes. "C( )" indicates the memory module to be swapped, namely modules where switching of storage modes is going to be carried out. "D( )" indicates the memory module allocated to memory space instead of memory module "C( )".

FIGS. 22 to 25 illustrate examples of data write operations from secondary storage area to main storage area. In FIGS. 22 to 25, reference numerals 616, 618, 620, and 622 denote data requested to be written to the main storage area. Reference numerals 528, 530, 532, 534, 536, 538, and 540 are memory modules originally in secondary storage mode, and reference numerals 529, 535, and 542 are memory modules originally in main storage mode. Returning to FIG. 20, the steps of the operation will be described.

In step S2002, CPU 302 detects a request for writing data to the main storage area, which is generated in accordance with, e.g., the boot-up of operating system 204 or launch of application 202. Here, the size of data to be written is "W3." CPU 302 monitors instructions that are executed and detects instructions that writes data to the main storage area.

In step S2004, CPU 302 calculates the number of memory modules "n" where data will be written in the entire available storage area of the module and the data size r3 of the remaining data. The number of memory modules "n" is obtained from the integer part of W3/S, and the data size "r3" of the remaining data is obtained by calculating "W3−n×S."

Figure 22:
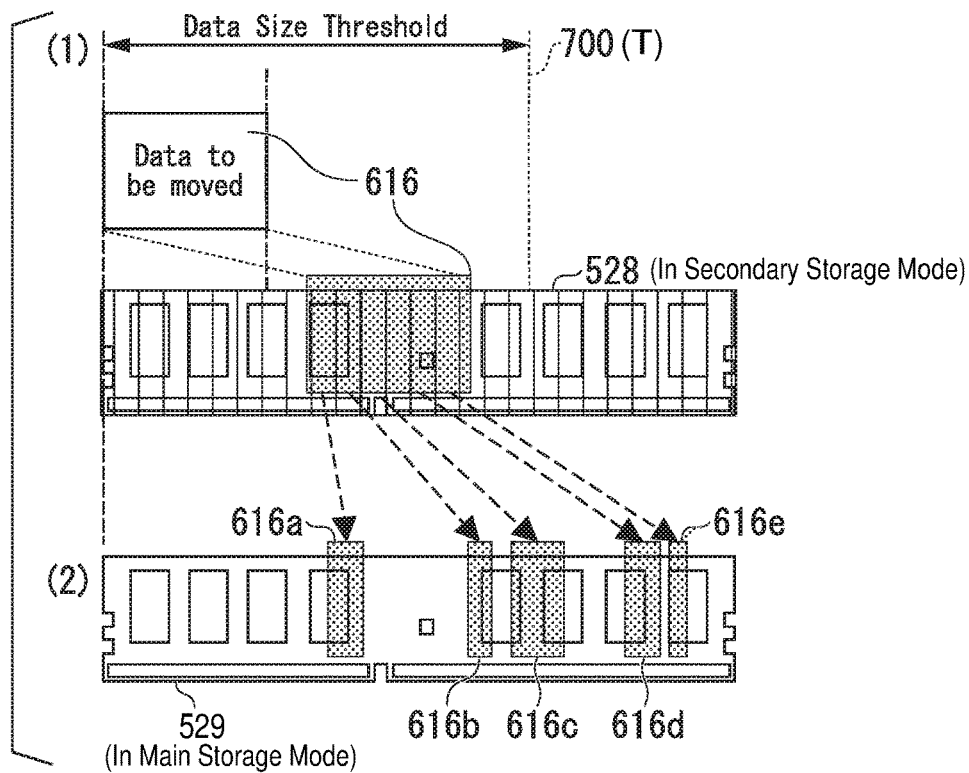
FIG. 22 illustrates an example of a process where data is written to the memory module by the electronic apparatus according to the present embodiment.

In step S2006, CPU 302 determines whether the number of memory modules "n" is greater than 0 or not. In the cases of FIG. 22(1) and FIG. 23(1), the memory controller 324 determines that the number of memory modules "n" is 0. In the cases of FIGS. 24(1) and 25(1), the memory controller 324 determines that the number of memory modules "n" is greater than 0.

Figure 24:
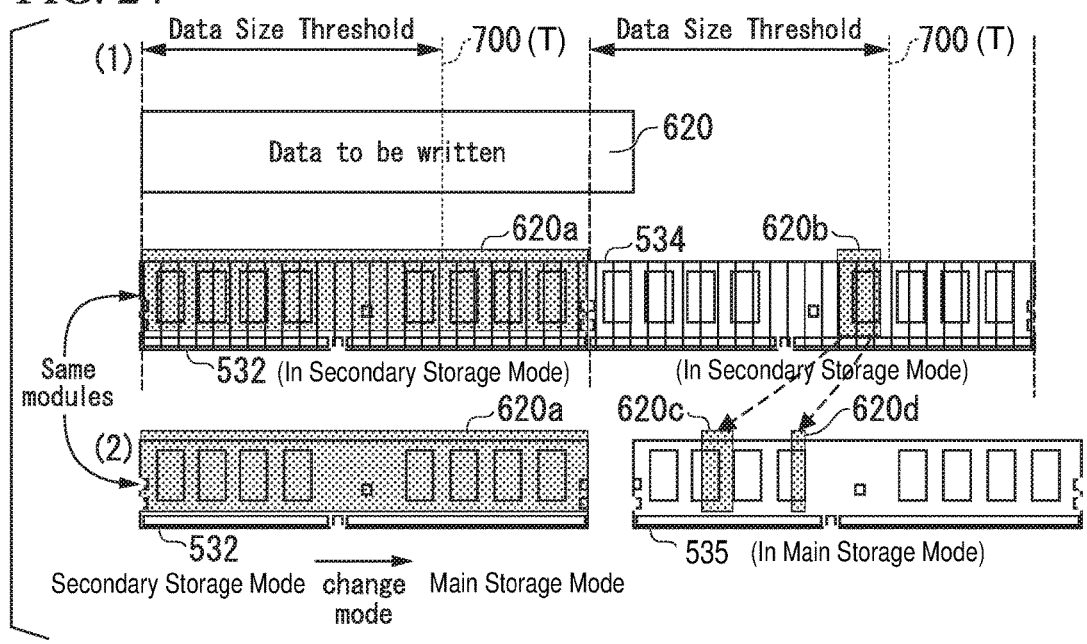
FIG. 24 illustrates an example of a process where data is written to the memory module by the electronic apparatus according to the present embodiment.
Figure 25:
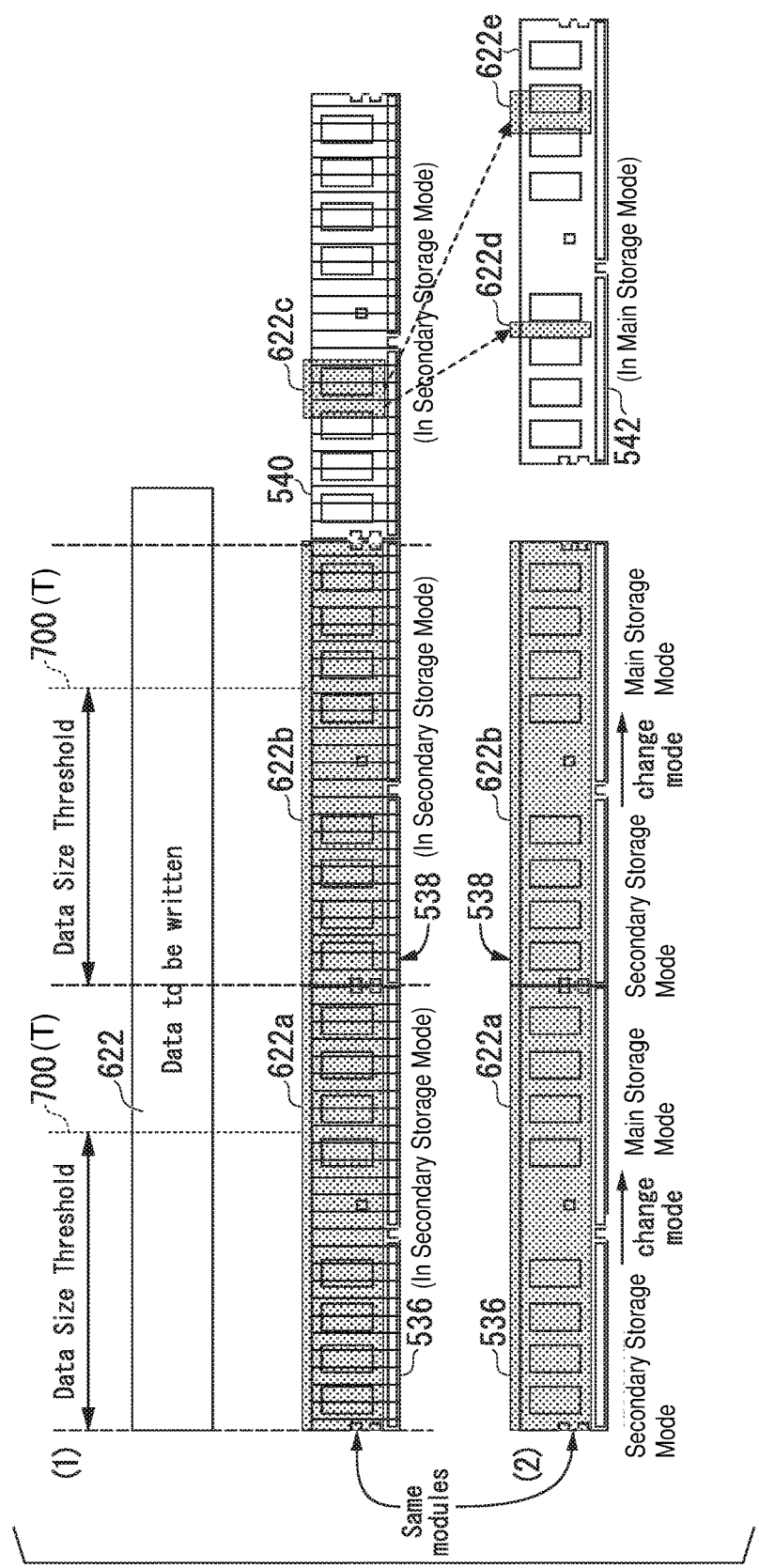
FIG. 25 illustrates an example of a process where data is written to the memory module by the electronic apparatus according to the present embodiment.

In FIG. 24(2), data 620a is written to the main storage area by switching the storage mode from the secondary storage mode to the main storage mode. With respect to the data size of the remaining data 620b, the memory controller 324 determines that the number of memory modules "n" is 0. Thus, conventional write with data transfer via memory bus is carried out for data 620b. In destination, data 620b corresponds to data 620c and 620d. In FIG. 25(2), data 622a is written to the main storage area by switching the storage mode of module from secondary storage mode to main storage mode for, the memory controller 324 determines that the number of memory modules "n" is greater than 0. Further, in FIG. 25(2), with respect to data sizes of the remaining data 622b and data 622c, the memory controller 324 determines that the number of memory modules "n" is greater than 0. Thus, data 622b is written to the main storage area by switching the storage mode of module from secondary storage mode to main storage mode. Further, in FIG. 25(2), with respect to a data size of the remaining data 622c, the memory controller 324 determines that the number of memory modules "n" is 0. Thus, content of data 622c is written as data 622d and data 622e according to conventional write with data transfer via memory bus. Note that in such case, data 622c is not written to continuous physical addresses.

In step S2008, CPU 302 determines whether the data size r3 of the remaining data is larger than or equal to the threshold T or not when it is determined that n is 0 in step S2006. In the case of FIG. 24(1), the memory controller 324 determines that the data size r3 of the data 620b is smaller than the threshold T. In the case of FIG. 25(1), the memory controller 324 determines that the data size r3 of the data 622c is smaller than the threshold T. In FIG. 24(2) and FIG. 25(2), the memory controller 324 determines that the data size r3 of the remaining data is smaller than the threshold T.

Step S2010 is executed when it is determined that n is greater than 0 in step S2006 and when it is determined that the data size r3 is greater than or equal to the threshold T in step S2008. In step S2010, CPU 302 inquires memory controller 324 in regard to a memory module C(n) operating in secondary storage mode where data to be written to the main storage area is stored and specifies the memory module C(n).

In step S2012, CPU 302 determines whether the memory module D(n) can be immediately allocated to secondary storage mode instead of memory module C(n) or not.

Step S2014 is executed when it is determined that the memory module D(n) can be immediately configured to secondary storage state in step S2012. In step S2014, memory controller 324 switches the memory module C(n) to main storage mode.

Figure 23:
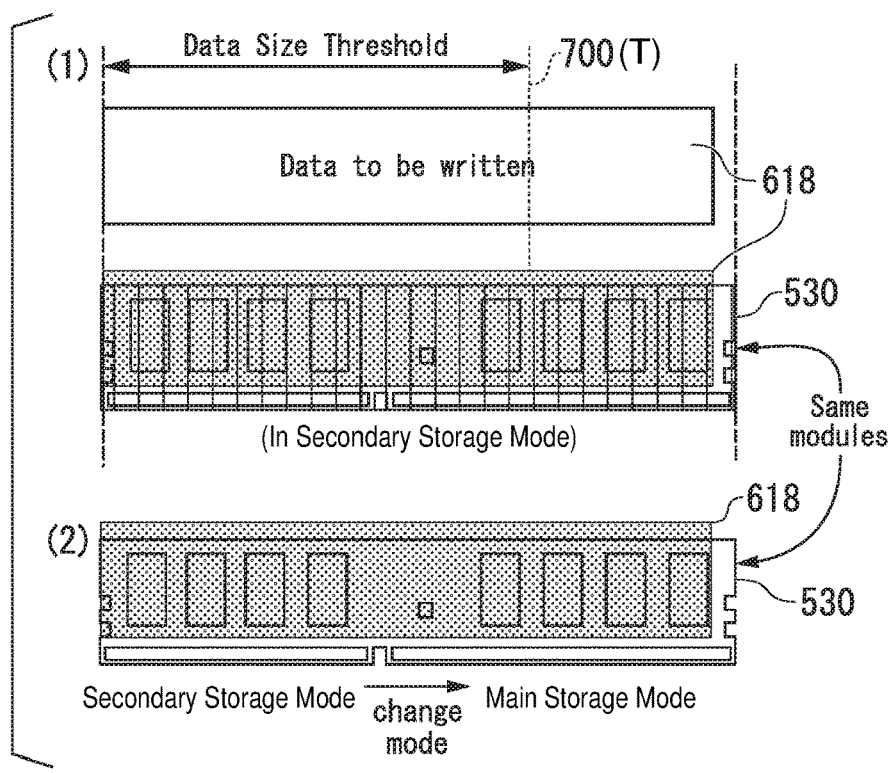
FIG. 23 illustrates an example of a process where data is written to the memory module by the electronic apparatus according to the present embodiment.

In FIG. 23(2), memory controller 324 changes memory module 530 in secondary storage mode where data 618 is stored from secondary storage mode to main storage mode. In FIG. 24(2), memory controller 324 changes memory module 532 in secondary storage mode where data 620a is stored from secondary storage mode to main storage mode. In FIG. 25(2), memory controller 324 changes memory module 536 and memory module 538 in secondary storage mode where data 622a and data 622b are stored from secondary storage mode to main storage mode.

In step S2016, operating system 204 updates the page table entry and the TLB entry corresponding to the physical addresses of the memory module C(n). The operating system 204 sets the continuous physical address allocation flag therein.

In step S2018, the memory controller 324 switches the memory module D(n) to secondary storage mode.

In step S2020, function 308 that notifies that interrupt is triggered from CPU 302 informs the operating system 204 of the interrupt. The interrupt notification function 308 notifies the operating system 204 that the storage mode of the memory module D(n) has been switched to secondary storage mode.

The operating system 204 that detects the interrupt from the CPU 302 updates metadata of the file system. The operating system 204 changes the configuration so that the data written to the memory module D(n) can be accessed from the file system used by operating system 204.

Step S2022 is executed when it is determined that the memory module D(n) cannot be immediately configured to the secondary storage mode in step S2012. In step S2022, the memory controller 324 determines whether reduction of the secondary storage area is permitted by the system configuration or not.

Step S2024 is executed when it is determined that the reduction of the secondary storage area is permitted in step S2022. In step S2024, the memory controller 324 switches the memory module C(n) to main storage mode.

In step S2026, the memory controller 324 updates the page table entries and the TLB entries corresponding to the address of memory module C(n) and sets the continuous physical address allocation flag therein.

In step S2028, function 308 that notifies that interrupt is triggered from CPU 302 informs the operating system 204 of the interrupt and notifies that the memory module D(n) has been changed to secondary storage mode. The operating system 204 that detects interrupt from CPU 302 updates metadata of the file system. The operating system 204 changes the configuration so that the data of the memory module D(n) can be accessed from the file system.

In step S2030, the CPU 302 subtracts 1 from the value of n after step S2020 or step S2028 is completed. Thereafter, the process proceeds to step S2006.

Step S2032 is executed when it is determined that the data size r3 is smaller than the threshold T in step S2008 and when it is determined that reduction of the secondary storage area is not permitted in step S2022. In step S2032, the memory controller 324 writes the data stored in the memory module 318 operating in the secondary storage mode to memory module 312 in main storage mode via the memory bus.

In FIG. 22(2), memory controller 324 writes data 616 to memory module 529 in main storage mode. Specifically, memory controller 324 first reads the data 616 stored in memory module 528 configured to secondary storage mode. Then, memory controller 324 writes data 616 to discontinuous storage areas of memory module 529 in main storage mode via the memory bus. For example, the memory controller 324 may divide the data 616 into data 616a, data 616b, data 616c, data 616d, and data 616e and write the data 616a, the data 616b, the data 616c, the data 616d, and the data 616e thereto in memory module 529.

In FIG. 24(2), memory controller 324 writes the remaining data 620b to memory module 535 in main storage mode. For example, memory controller 324 divides the remaining data 620b into data 620c and data 620d and writes the data 620c and the data 620d to memory module 535.

In FIG. 25(2), memory controller 324 divides the remaining data 622c into data 622d and data 622e and writes data 622d and data 622e to memory module 542 configured to main storage mode.

The electronic apparatus 100 according to the above embodiment includes two CPUs, but the number of CPUs mounted on the electronic apparatus 100 may be one, or three or even more.

Also, the number of memory chips mounted on board 402 is not limited to 8, and may be 1 to 7, or may be 9 or even more.

In the above embodiment, the storage state is switched in units of memory modules, but the present invention is not limited thereto. For example, the storage mode may be switched in units of a memory chip mounted in the memory module.

Memory interleaving may be carried out by the electronic apparatus 100. For example, the storage modes of a plurality of memory modules may be collectively changed in units of multiple memory modules of 2, 3, 4, or the like. In this case, because wait time of CPU during memory access can be shortened, overall processing speed can be improved. Further, the memory module may be subjected to a mirroring setting. By such configuration, better fault tolerance can be achieved.

Also, the values set in the storage mode configuration register 1002, the storage mode state register 1004, and the spare module register 1006 may be set in a memory map, and the CPU 104 may rewrite the values set in the memory map by executing programs.

Also, values set in the storage mode configuration register 1002, the storage mode state register 1004, and the spare module register 1006 may be changed by the user.

Data described in embodiment described above can be any type of the data such as metadata, files, intermediate data or data for various purposes. Also, the embodiment described above can be applied to storage used for different memory areas. Memory areas include stack areas, heap areas, or shared memories.

According to the embodiment described above, next generation computer architecture without the distinction of storage hierarchy including main storage area and secondary storage area is used. In this case, it is possible to continue to the use of software assets such as operating systems and applications designed for conventional computing systems where there is the clear distinction between the main storage area and the secondary storage area with minimal modification.

Also, in the transitional period when integration of storage hierarchy in computing systems shall be proceeding, gradual transition from conventional software assets to new software assets will be needed. According to the embodiment described above, both new and older software can coexist in the same computing system while maintaining compatibility of the conventional software assets.

Also, because data are transferred between the main storage area and the secondary storage area using the same type of memory bus and same type of memory controller, overall computing processes can be simplified compared to conventional computing systems. Also, because it is possible to transfer data with smaller latency with a wider bandwidth compared to conventional buses used for storage by using the memory bus. Thus, a process involving data transfer between the main storage area and the secondary storage area can be performed at higher speeds.

Also, according to at least one embodiment, the memory module can be used for both main storage and secondary storage, and the storage mode of the memory module can be switched between the main storage mode and the secondary storage mode during the operation of the computer system. Thereby, the capacity and arrangement of the main storage area and the secondary storage area can be flexibly reconfigured depending on the usage and nature of computing system.

Here, it is assumed that a large amount of data transfer that exceeds majority of storage capacity of the memory module or possibly consumes multiple memory modules occurs between the main storage area and the secondary storage area. In such cases, data can be transferred by switching the storage mode of the memory module dynamically according to the present embodiment. For that reason, even when actual data is not transferred between the memory modules via the memory bus, it can be recognized from the operating system or the application that the data are transferred between the main storage area and the secondary storage area. Furthermore, the processing time can be reduced significantly compared to cases when actual data are transferred between memory modules by data transfer through some data bus.

According to at least one embodiment, it is also possible to combine a process involving transfer of real data between memory modules via memory bus and a process of dynamically switching the storage modes.

According to at least one embodiment, in addition to advantages in performance, hardware configuration can be simplified. That is, basically there is only a single type of memory module mounted in the slots. Compared to computer systems where conventional volatile memory modules dedicated for main storage and non-volatile SSD type memory modules coexist, maintenance and operation of computer will be easier since there is no need to use different BIOS/EFIs depending on type of memory modules that are installed.

In the above-described embodiment, the main storage area is an example of a first storage area, and the secondary storage area is an example of a second storage area. Also, the CPU is an example of a processor, and the page table is an example of a conversion table.

While certain embodiments have been described, these embodiments have been presented as only an example, and there are no intentions to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a processor;
   non-volatile memory devices having first modules running in memory mode and second modules running in storage mode, wherein executable code of active programs being executed in the processor are stored in the first modules and executable code of non-active programs are stored in the second modules; and
   a memory controller configured to map logical addresses of the active programs to physical locations of the first modules, wherein
   in response to a request to load data stored in a third module, which is running in storage mode, into a space that is mapped by the memory controller, the processor changes the mode of the third module from storage mode to memory mode and the memory controller creates a mapping for the data stored in the third module.

2. The electronic apparatus according to claim 1, wherein the data requested to be loaded is data of one of the non-active programs.

3. The electronic apparatus according to claim 1, wherein the processor changes the mode of the third module, upon determining that a size of the data is greater than a threshold amount.

4. The electronic apparatus according to claim 1, wherein an operating system is executed in the processor and the operating system implements a file system across the second modules.

5. The electronic apparatus according to claim 4, wherein in response to the changing of the mode of the third module, the operating system reduces a total size of the file system by an amount equal to a size of the third module.

6. The electronic apparatus according to claim 1, wherein in response to a request to load data stored in a fourth module, which is running in storage mode, into a space that is mapped by the memory controller, the memory controller copies the data stored in the fourth module to one of the first modules and creates a mapping for the copied data.

7. The electronic apparatus according to claim 6, wherein the data stored in the fourth module is stored in a continuous physical region of the fourth module.

8. An electronic apparatus comprising:
a processor;
non-volatile memory devices having first modules running in memory mode and second modules running in storage mode, wherein executable code of active programs being executed in the processor are stored in the first modules and executable code of non-active programs are stored in the second modules; and
a memory controller configured to map logical addresses of the active programs to physical locations of the first modules, wherein
in response to a request to copy data loaded into a space that is mapped by the memory controller to a module running in storage mode, the processor changes the mode of a third module, which is storing a portion of the data and running in memory mode, to storage mode.

9. The electronic apparatus according to claim 8, wherein the memory controller copies other data stored in the third module into a fourth module which is running in memory mode.

10. The electronic apparatus according to claim 8, wherein the request is generated as a result of the active program becoming non-active.

11. The electronic apparatus according to claim 8, wherein
the processor changes the mode of the third module, upon determining that a size of the data is greater than a threshold amount.

12. The electronic apparatus according to claim 8, wherein
an operating system is executed in the processor and the operating system implements a file system across the second modules.

13. The electronic apparatus according to claim 12, wherein
in response to the changing of the mode of the third module, the operating system increases a total size of the file system.

14. The electronic apparatus according to claim 8, wherein
in response to the request to copy the data loaded into the space that is mapped by the memory controller to the module running in storage mode, the memory controller copies the data stored in a fourth module, which is also storing a portion of the data and running in memory mode, into one of the second modules.

15. An electronic apparatus comprising:
a processor having an operating system executed therein; and
non-volatile memory devices having first modules running in memory mode and second modules running in storage mode, wherein
the operating system manages mappings to physical locations of modules running in memory mode using page tables and mappings to physical locations of modules running in storage mode by implementing a file system across the second modules, and
the processor is configured to change the mode of a third module, which is running in storage mode, to memory mode, if a first condition is met, and to change the mode of a fourth module, which is running in memory mode, to storage mode, if a second condition is met.

16. The electronic apparatus according to claim 15, wherein
the first condition is met when the processor receives a request to load data stored in the third module into a space that is mapped by the page tables and a size of the data is greater than a threshold amount.

17. The electronic apparatus according to claim 16, wherein the page tables are updated to include mappings to physical locations of the data stored in the third module.

18. The electronic apparatus according to claim 15, wherein
the second condition is met when the processor receives a request to copy data loaded into a space that is mapped by the page tables to a module running in storage mode and a size of the data is greater than a threshold amount.

19. The electronic apparatus according to claim 18, wherein if the fourth module contains data other than the data requested to be loaded into the space that is mapped by the page tables, the other data is copied to a fifth module which is running in memory mode.

20. The electronic apparatus according to claim 19, wherein the mappings to physical locations of modules running in storage mode are updated to include mappings to physical locations of the data stored in the fourth module.

* * * * *